(12) United States Patent
Aruga et al.

(10) Patent No.: US 9,193,882 B2
(45) Date of Patent: *Nov. 24, 2015

(54) INK COMPOSITION FOR INK JET RECORDING, INK SUPPLY SYSTEM, AND INK JET RECORDING APPARATUS

(71) Applicant: SEIKO EPSON CORPORATION, Tokyo (JP)

(72) Inventors: Tomohiro Aruga, Matsumoto (JP); Yoichi Yamada, Shiojiri (JP); Masaru Kobashi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/396,276

(22) PCT Filed: Mar. 12, 2013

(86) PCT No.: PCT/JP2013/056813
§ 371 (c)(1),
(2) Date: Oct. 22, 2014

(87) PCT Pub. No.: WO2013/161410
PCT Pub. Date: Oct. 31, 2013

(65) Prior Publication Data
US 2015/0085034 A1    Mar. 26, 2015

(30) Foreign Application Priority Data

Apr. 23, 2012  (JP) .................................. 2012-097538
Apr. 23, 2012  (JP) .................................. 2012-097540

(51) Int. Cl.
C09D 11/30    (2014.01)
C09D 11/38    (2014.01)
B41J 2/175    (2006.01)

(52) U.S. Cl.
CPC ............. *C09D 11/30* (2013.01); *B41J 2/17563* (2013.01); *C09D 11/38* (2013.01)

(58) Field of Classification Search
CPC ......... B41J 2/17563; B41J 2/2107; B41J 2/17
See application file for complete search history.

(56) References Cited

U.S. PATENT DOCUMENTS

| | | |
|---|---|---|
| 7,429,293 B2 | 9/2008 | Cai |
| 2003/0076391 A1 | 4/2003 | Wilson et al. |
| 2003/0196569 A1 | 10/2003 | Yatake et al. |
| 2014/0125743 A1 | 5/2014 | Aruga |
| 2014/0218451 A1* | 8/2014 | Iseki et al. ................ 347/100 |

FOREIGN PATENT DOCUMENTS

| | | |
|---|---|---|
| CN | 103804992 A | 5/2014 |
| JP | H11-504874 A | 5/1999 |
| JP | 2003-127427 A | 5/2003 |
| JP | 2003-246952 A | 9/2003 |

(Continued)

*Primary Examiner* — Juanita D Jackson
(74) *Attorney, Agent, or Firm* — Harness, Dickey & Pierce, P.L.C.

(57) ABSTRACT

An ink composition is provided which has excellent initial filling characteristics and continuous printing stability even in the case of an ink composition (for example, dissolved nitrogen is equal to or greater than 5 ppm) which is almost not deaerated or an ink composition (for example, dissolved nitrogen is equal to or greater than 7 ppm) which is not deaerated at all. The ink composition includes an alkylene oxide adduct (A) of acetylenic glycol in which a main chain has 12 or more carbon atoms, acetylenic glycol (B) in which a main chain has 10 or more carbon atoms, and polyoxyalkylene alkyl ether (C).

13 Claims, 2 Drawing Sheets

(56) References Cited

FOREIGN PATENT DOCUMENTS

| JP | 2003-253599 A | 9/2003 |
| JP | 2004-315739 A | 11/2004 |
| JP | 2006-095972 A | 4/2006 |
| JP | 2007-277330 A | 10/2007 |
| JP | 2010-023362 A | 2/2010 |
| JP | 2011-042104 A | 3/2011 |
| WO | WO-96-34761 A1 | 11/1996 |

* cited by examiner

TRANSPORTING DIRECTION

INK COMPOSITION FOR INK JET RECORDING, INK SUPPLY SYSTEM, AND INK JET RECORDING APPARATUS

CROSS-REFERENCE TO RELATED APPLICATIONS

This application is a U.S. National Phase application of PCT/JP2013/056813, filed on Mar. 12, 2013, and published in Japanese as WO 2013/161410 A1 on Oct. 31, 2013. This application is based upon and claims the benefit of priority from Japanese Patent Application No. 2012-097538, filed on Apr. 23, 2012 and Japanese Patent Application No. 2012-097540 filed on Apr. 23, 2012; the entire contents of which are incorporated herein by reference.

TECHNICAL FIELD

The present invention relates to an ink composition for ink jet recording. In addition, the present invention relates to an ink supply system and an ink jet recording apparatus provided with the same.

BACKGROUND ART

In the related art, a printing method, which uses an ink jet recording method, discharges and causes small ink droplets to fly from a print head, and attaches the ink droplets onto a recording medium, such as a paper sheet. At a time of discharging ink, a discharging failure tends to occur due to bubbles generated in the ink. Here, various technologies, which eliminate the bubbles and stably discharge the ink droplets by using a deaerator or the like and deaerating the ink, have been suggested.

For example, JP-A-2011-42104 discloses deaerated ink (air decompression rate of a film deaeration module is −90 kPA, and dissolved oxygen of the ink at a module outlet is 1.86 ppm (20° C.)) which is made by deaerating cyan ink made of 13 mass % of reactive and water-soluble dye (C. I Reactive Blue 72), 60 mass % of ion exchanged water, 23.7 mass % of ethylene glycol, 0.3 mass % of surfactant (Olefin E 1010:acetylenic glycol-based surfactant manufactured by Nissin Chemical Industry Co., Ltd.), and 2 mass % of anti-mold agent (Proxel GXL-S manufactured by Arch Chemicals Co., Ltd.), by using a film deaeration module (external refluxing type, EF-G3 manufactured by DIC Co., Ltd) (refer to paragraphs 0120 and 0124 in JP-A-2011-42104).

In addition, for example, as an ink supply method to the print head, a method of supplying the ink to the print head which is attached to a printer via a tube from an ink outlet portion of an ink tank, is disclosed (for example, JP-A-2011-4210 and JP-T-11-504874). According to the ink supply method disclosed in JP-A-2011-42104 and JP-T-11-504874, the ink tank is provided with a liquid pouring path (hereinafter, referred to as an "ink filling port", or a "liquid pouring portion"), and a user can easily pour the ink from the liquid pouring path.

SUMMARY OF INVENTION

Technical Problem

However, a first problem is that an ink tank which is available on the market is relatively cheap, but the ink and the atmosphere may come into contact with each other according to the structure thereof. In addition, in a general open type cartridge as an ink cartridge which is available on the market, the air gradually dissolves into the ink even when deaerated ink is filled. When the deaerated ink which is disclosed in JP-A-2011-42104 goes through the ink tank or the open type cartridge, the air dissolves into the ink, and thus, deaeration is of no use and a problem of a discharging failure occurs.

In addition, a second problem is that, according to the ink supply method disclosed in JP-T-11-504874 and JP-A-2003-127427, the air is introduced into the ink tank from the air introducing port of the ink tank as the ink is supplied to the print head side from the ink tank. Here, depending on a position of the air introducing port for introducing the air into the ink tank, there is a case where the air (bubbles) passes through the ink and is introduced into the ink tank. Examples of this case include a case where the air introducing path for introducing the air is provided and an ink storage container having a structure which generates bubbles in the ink is used. In this case, when the bubbles flow out of the ink tank together with the ink and are carried to the print head, a problem of a filling failure or a discharging failure in the print head occurs.

Furthermore, there is an ink jet recording apparatus which is provided with an ink storage container in which the atmosphere and the ink can be in contact with each other, like the open type ink cartridge. Even when the ink is supplied to the print head in the ink jet recording apparatus, ink including bubbles is carried to the print head, and a problem of a filling failure or a discharging failure in the print head occurs. The filling failure and the discharging failure in the print head cause a deterioration of initial filling characteristics and continuous printing stability.

Here, a first advantage of the present invention is to provide an ink composition for ink jet recording having excellent initial filling characteristics and continuous printing stability even in a case of an ink composition (for example, dissolved nitrogen is equal to or greater than 5 ppm) which is almost not deaerated or an ink composition (for example, dissolved nitrogen is equal to or greater than 7 ppm) which is completely deaerated.

Here, a second advantage of the present invention is to provide an ink supply system and an ink jet recording apparatus, in which at least any one of the initial filling characteristics and the continuous printing stability is excellent, even in a case of the ink which is stored in the ink storage container that can bring the atmosphere and the ink into contact with each other and which includes bubbles.

Therefore, the advantages of the present invention are to achieve at least one of the above-described first or second advantages.

Solution to Problem

The inventors have thoroughly investigated the solutions to the above-described problems. As a result, the inventors found that the above-described problem is solved by an ink composition for ink jet recording including an alkylene oxide adduct of acetylenic glycol in which a main chain has 12 or more carbon atoms, acetylenic glycol in which the main chain has 10 or more carbon atoms, and polyoxyalkylene alkyl ether, and completed a first present invention (embodiment A).

In addition, the inventors found that the above-described problem is solved by an ink supply system which is provided with a filter in an ink supply path that connects the ink storage container and a print head to each other, and which makes the ink composition supplied (including "replenishing", and the same applies to the following) from the ink storage container to the print head have a predetermined composition even when the ink storage container in which the atmosphere and the ink can be brought into contact with each other is used, and completed a second present invention (embodiment B).

In other words, preferable aspects of the present invention are as follows.

[1]

An ink composition for ink jet recording, including: an alkylene oxide adduct (A) of acetylenic glycol in which a main chain has 12 or more carbon atoms; acetylenic glycol (B) in which the main chain has 10 or more carbon atoms; and polyoxyalkylene alkyl ether (C).

[2]

The ink composition for ink jet recording described in [1], in which an HLB value of the polyoxyalkylene alkyl ether (C) is 12 to 16.

[3]

The ink composition for ink jet recording described in [1], in which the alkylene oxide adduct is an ethylene oxide adduct.

[4]

The ink composition for ink jet recording described in [1], in which a mass ratio between a content of polyoxyalkylene alkyl ether (C) and a total content of alkylene oxide adduct (A) of acetylenic glycol in which the main chain has 12 or more carbon atoms and acetylenic glycol (B) in which the main chain has 10 or more carbon atoms is 0.10:1.0 to 0.50:1.0.

[5]

The ink composition for ink jet recording described in [1], in which an HLB value of the alkylene oxide adduct (A) of acetylenic glycol in which the main chain has 12 or more carbon atoms is 8 to 15.

[6]

The ink composition for ink jet recording described in [1], in which an HLB value of the acetylenic glycol (B) in which the main chain has 10 or more carbon atoms is equal to or less than 4.

[7]

The ink composition for ink jet recording described in [1], further includes a coloring agent.

[8]

The ink composition for ink jet recording described in [1], further includes an organic solvent.

[9]

An ink supply system, including: an ink storage container in which the atmosphere and the ink can be brought into contact with each other and which stores the ink described in [1]; a print head which discharges the ink; an ink supply path which connects the ink storage container and the print head to each other, and in which the ink flows to the print head from the ink storage container; and a filter (D) which is provided in the ink supply path.

[10]

The ink supply system described in [9], in which an average pore diameter of the filter is equal to or less than a nozzle diameter of a nozzle of the print head.

[11]

The ink supply system described in [9], in which a plurality of filters (D) are provided in the ink supply path.

[12]

The ink supply system described in [9], in which a material of the filter (D) is a resin.

[13]

An ink jet recording apparatus, including the ink supply system described in [9], in which the ink supplied to the print head from the ink storage container is discharged toward a recording medium from the print head and a recording is performed.

DESCRIPTION OF EMBODIMENTS

Figure 1:
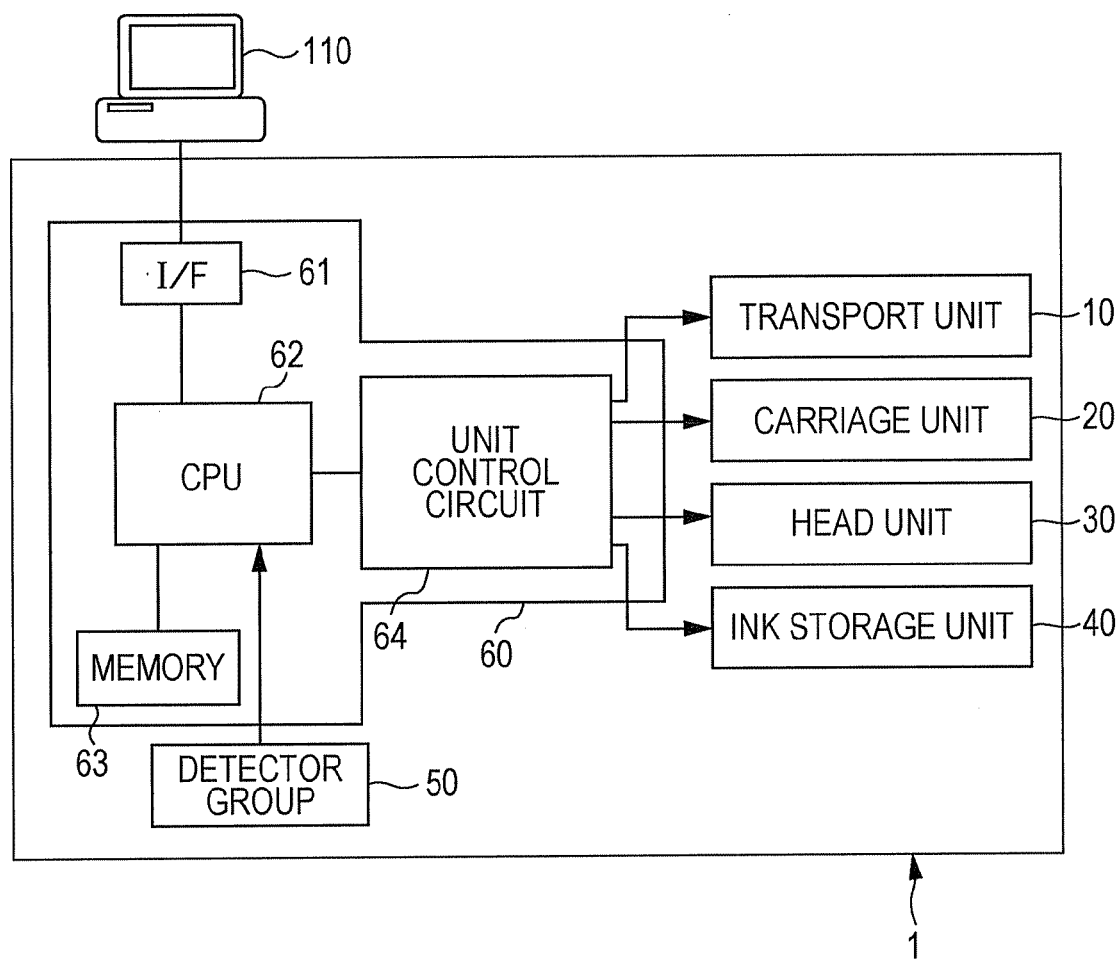
FIG. 1 is a block diagram illustrating the entire configuration of a printer which is provided with an ink supply system.

Hereinafter, embodiments for realizing the present invention will be described in detail, preferably for each embodiment A and embodiment B. In addition, the present invention is not limited to the embodiments described below, and various modifications within the scope of the invention can be realized.

Embodiment A

Ink Composition for Ink Jet Recording

An embodiment of the present invention relates to an ink composition (hereinafter, simply referred to as an "ink composition") for ink jet recording. The ink composition includes: an alkylene oxide adduct (A) of acetylenic glycol in which a main chain has 12 or more carbon atoms; acetylenic glycol (B) in which the main chain has 10 or more carbon atoms; and polyoxyalkylene alkyl ether (C).

Hereinafter, additives (components) which are included or can be included in the ink composition of the embodiment A will be described.

Alkylene Oxide Adduct (A) of Acetylenic Glycol in which Main Chain has 12 or More Carbon Atoms The ink composition of the embodiment A includes the alkylene oxide adduct (A) (hereinafter, the alkylene oxide adduct is referred to as an "AO adduct") of acetylenic glycol in which the main chain has 12 or more carbon atoms. The AO adduct of acetylenic glycol in which the main chain has 12 or more carbon atoms includes acetylenic glycol-based surfactant together with acetylenic glycol in which the main chain has 10 or more carbon atoms that will be described later. In addition, the "main chain" in the specification means a main chain which is based on IUPAC nomenclature.

The above-described acetylenic glycol-based surfactant is included in a nonionic surfactant. The nonionic surfactant operates to uniformly spread ink on a recording medium. For this reason, when the ink jet recording is performed by using the ink composition including the nonionic surfactant, it is possible to obtain an image having little ink bleeding and a relatively high definition.

Among the acetylenic glycol-based surfactants, a surfactant in which the main chain has 12 or more carbon atoms has an excellent wettability with respect to foreign substances that can be a reason for occurrence of bubbles in polymer members, such as rubber or plastic, that constitutes the ink flow path, and the ink. Accordingly, it is possible to suppress retention of the generated bubbles on a flow path surface of the polymer member from an ink tank to a head. Accordingly, initial filling characteristics are excellent, and dot omission due to a growth of the retained bubbles and detachment of the bubbles attached to the flow path surface, can also be prevented. As a result, continuous printing stability becomes excellent.

There is a case where acetylenic glycol in which the main chain has 12 or more carbon atoms cannot be dissolved (dispersed) stably in water-based ink including water as a solvent. In contrast, the AO adduct of acetylenic glycol in which the main chain has 12 or more carbon atoms has an excellent solubility in the above-described water-based ink.

In addition, the above-described matter is a matter which merely describes a case where the ink composition of the embodiment A includes acetylenic glycol in which the main chain has 12 or more carbon atoms instead of the AO adduct of acetylenic glycol in which the main chain has 12 or more carbon atoms, and is an item which is totally unrelated to acetylenic glycol in which the main chain has 12 or more carbon atoms among acetylenic glycols in which the main chain has 10 or more carbon atoms (to be described later). In other words, when the ink composition of the embodiment A includes the AO adduct of acetylenic glycol in which the main chain has 12 or more carbon atoms and acetylenic glycol in which the main chain has 12 or more carbon atoms among acetylenic glycols in which the main chain has 10 or more carbon atoms, the solubility is excellent in the water-based ink.

It is preferable that an HLB (hydrophile-lipophile balance) value of the AO adduct of acetylenic glycol in which the main chain has 12 or more carbon atoms be 8 to 15 since the above-described wettability is superior. In addition, the HLB value in the specification is an HLB value which is defined by a Griffin method.

Examples of the AO adduct of acetylenic glycol in which the main chain has 12 or more carbon atoms are not limited to the description below, but can include ethoxylates of acetylenic glycol which is represented by the general formula (1) described below.

Chem. 1

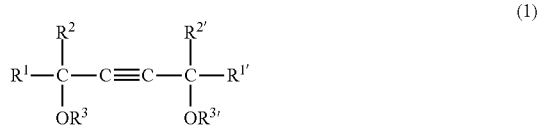

(1)

$R^1$, $R^{1'}$, $R^2$, and $R^{2'}$ in the above-described formula (1) are independent of each other and represent an alkyl group which has 1 to 5 carbon atoms, and have a main chain which has 12 or more carbon atoms. —$OR^3$ represents —OH or —O($C_2H_4$O)$_m$H. —$OR^{3'}$ represents —OH or —O($C_2H_4$O)$_m$—H. At this time, m and n are independent of each other, and are values which include a decimal from 0.5 to 25. m+n is a value which includes a decimal from 1 to 40 (However, a case where both —$OR^3$ and —$OR^{3'}$ are —OH is excluded).

Specific examples of the AO adduct of acetylenic glycol in which the main chain has 12 or more carbon atoms are not limited to those described below, but can preferably include ethoxylates of 2,5,8,11-tetramethyl-6-dodecyne-5,8-diol, and ethoxylates of 5,8-dimethyl-6-dodecyne-5,8-diol.

An ethylene oxide adduct of acetylenic glycol and a propylene oxide adduct of acetylenic glycol are preferable among the above-described alkylene oxide adducts of acetylenic glycol. The ethylene oxide adduct of acetylenic glycol is more preferable. It is preferable that, in each of R3 and R3', the number of additional moles of a unit of an ethylene oxide in acetylenic glycol be 1 to 20 moles, respectively, and that the total number of the additional moles (sum of R3 and R3') be 2 to 40 moles. When the total number of the additional moles of the ethylene oxide is equal to or less than 40 moles, it is possible to reduce a static and a dynamic surface tension, and an absorption performance of the ink becomes excellent.

Examples of a commercial product of the AO adduct of acetylenic glycol in which the main chain has 12 or more carbon atoms are not limited to the description below, but can include Olefin EXP 4300 (name of product manufactured by Nissin Chemical Industry Co., Ltd, 12 carbon atoms, ethylene oxide adduct).

One type of AO adduct of acetylenic glycol in which the main chain has 12 or more carbon atoms may be used independently, and two or more types of AO adducts of acetylenic glycol in which the main chain has 12 or more carbon atoms may be used.

It is preferable to consider the sum with the content of acetylenic glycol in which the main chain has 10 or more carbon atoms described below for the content of the AO adduct of acetylenic glycol in which the main chain has 12 or more carbon atoms. Then, the content of the AO adduct of acetylenic glycol in which the main chain has 12 or more carbon atoms may be 0.05 mass % to 0.30 mass %, for example, with respect to the total mass (100 mass %) of the ink composition.

Acetylenic Glycol (B) in which Main Chain has 10 or More Carbon Atoms

The ink composition of the embodiment A includes acetylenic glycol in which the main chain has 10 or more carbon atoms. Among the acetylenic glycol-based surfactants, acetylenic glycol in which the main chain has 10 or more carbon atoms can effectively eliminate bubbles generated in the ink. Accordingly, the initial filling characteristics and the continuous printing stability become excellent.

Since the defoaming properties are excellent, the HLB value of acetylenic glycol in which the main chain has 10 or more carbon atoms is preferably equal to or less than 7, and more preferably, 3 to 5.

In addition, in a case of acetylenic glycol in which the main chain has 10 or more carbon atoms, if an alkylene oxide is not added, the defoaming properties are excellent. Acetylenic glycol in which the main chain has 10 or more carbon atoms has excellent defoaming properties since acetylenic glycol is a component which is difficult to be dissolved in water.

Examples of acetylenic glycol in which the main chain has 10 or more carbon atoms are not limited to the description below, but can include acetylenic glycol which is represented by the general formula (2) described below.

Chem. 2

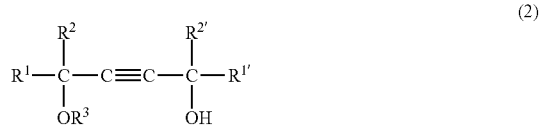

(2)

$R^1$, $R^{1'}$, $R^2$, and $R^{2'}$ in the above-described formula (2) are independent of each other and represent an alkyl group which has 1 to 5 carbon atoms, and has a main chain which has 10 or more carbon atoms. In addition, $R^1$, $R^{1'}$, $R^2$, and $R^{2'}$ in the formula (2) are not related to $R^1$, $R^{1'}$, $R^2$, and $R^{2'}$ in the above-described formula (1).

Specific examples of acetylenic glycol in which the main chain has 10 or more carbon atoms are not limited to those described below, but can preferably include 2,5,8,11-tetramethyl-6-dodecyne-5,8-diol, 5,8-dimethyl-6-dodecyne-5,8-diol, 2,4,7,9-tetramethyl-5-decyne-4,7-diol, and 4,7-dimethyl-5-decyne-4,7-diol.

Examples of a commercial product of acetylenic glycol in which the main chain has 10 or more carbon atoms are not limited to those described below, but can include Surfynol 104PG50 (2,4,7,9-tetramethyl-5-decyne-4,7-diol) and Surfynol DF110D (2,5,8,11-tetramethyl-6-dodecyne-5,8-diol) (those described above are names of products manufactured by Air Products and Chemicals, Inc.)

One type of acetylenic glycol in which the main chain has 10 or more carbon atoms may be used independently, and two or more types of acetylenic glycol in which the main chain has 10 or more carbon atoms may be used in combination.

It is preferable to consider the sum with the content of the above-described AO adduct of acetylenic glycol in which the main chain has 12 or more carbon atoms for the content of acetylenic glycol in which the main chain has 10 or more carbon atoms. Then, the content of acetylenic glycol in which the main chain has 10 or more carbon atoms may be 0.05 mass % to 0.30 mass %, for example, with respect to the total mass (100 mass %) of the ink composition.

The total content of acetylenic glycol in which the main chain has 10 or more carbon atoms and the AO adduct of acetylenic glycol in which the main chain has 12 or more carbon atoms is preferably 0.1 mass % to 0.6 mass %, and more preferably, 0.1 mass % to 0.5 mass %. When the total content is within this range, the solubility in water becomes excellent, and it is possible to effectively prevent occurrence of aggregates when these acetylenic glycols are combined.

In addition, the mass ratio between the content of acetylenic glycol in which the main chain has 10 or more carbon atoms and the above-described AO adduct of acetylenic glycol in which the main chain has 12 or more carbon atoms is preferably 0.5:1 to 2.5:1, more preferably, 0.5:1 to 2.0:1, and still more preferably, 0.5:1 to 1.5:1. When the mass ratio is within this range, it is possible to make the ink composition for ink jet recording which has excellent initial filling characteristics and continuous printing stability.

Polyoxyalkylene Alkyl Ether (C)

The ink composition of the embodiment A includes polyoxyalkylene alkyl ether. Both the above-described AO adducts of acetylenic glycol in which the main chain has 12 or more carbon atoms and acetylenic glycol in which the main chain has 10 or more carbon atoms do not have excellent solubility in water or a water-based organic solvent. Here, when the ink composition further includes polyoxyalkylene alkyl ether, the polyoxyalkylene alkyl ether acts as a solubilizing agent which dissolves or disperses the above-described acetylenic glycol into the ink. In other words, the polyoxyalkylene alkyl ether is a solubilizing agent for the above-described acetylenic glycol-based compound. Furthermore, any of the above-described acetylenic glycols has a low dynamic surface tension, and the polyoxyalkylene alkyl ether can be a solubilizing agent which does not influence the low dynamic surface tension.

Since the initial filling characteristics and the continuous printing stability are superior, the HLB value of polyoxyalkylene alkyl ether is preferably 11 to 16, and more preferably, 12 to 15.

Examples of polyoxyalkylene alkyl ether are not limited to those described below, but can include a compound represented by the formula (3) described below.

$$R^4O(C_2H_4O)_w(C_3H_6O)_x(C_2H_4O)_y(C_3H_6O)_zH \qquad (3)$$

In the above-described formula (3), $R^4$ represents an alkyl group which has 1 to 20 carbon atoms, w is in a range of 1 to 20, and x, y, and z are independent of each other and are 0 or in a range of 1 to 20. However, w+x+y+z=5 to 30.

In the above-described formula (3), $R^4$ is preferably an alkyl group which has 5 to 15 carbon atoms, and more preferably, an alkyl group which has 10 to 15 carbon atoms. In addition, w+x+y+z is preferably 5 to 30, and more preferably, 5 to 25.

Specific examples of polyoxyalkylene alkyl ether include the chemical formulas below. In addition, polyoxyalkylene alkyl ether is not limited to those described below.

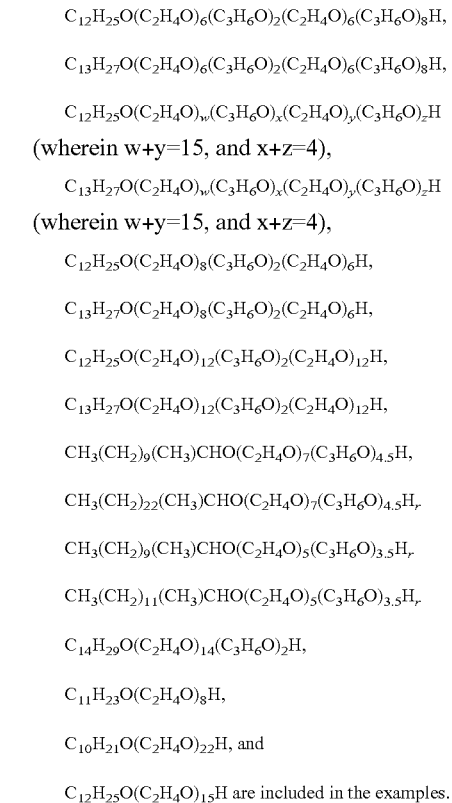

(wherein w+y=15, and x+z=4), $C_{13}H_{27}O(C_2H_4O)_w(C_3H_6O)_x(C_2H_4O)_y(C_3H_6O)_zH$ (wherein w+y=15, and x+z=4),

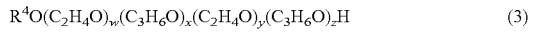

$C_{12}H_{25}O(C_2H_4O)_{15}H$ are included in the examples.

Examples of a commercial product of polyoxyalkylene alkyl ether are not limited to those described below, but can include Noigen DL-0415 (RO$(C_2H_4O)_w(C_2H_6O)_x(C_2H_4O)_y$ $(C_2H_6O)_z$H, "R": alkyl which has 12 or 13 carbon atoms, w+y=15, x+z=4, HLB value is 15.0), Noigen ET-116B (RO $(C_2H_4O)_w(C_2H_6O)_x$H, "R": alkyl which has 12 or 14 carbon atoms, w=7, x=4.5, HLB value is 12.0), Noigen ET-106A (RO$(C_2H_4O)_w(C_2H_6O)_x$H, "R": alkyl which has 12 or 14 carbon atoms, w=5, x=3.5, HLB value is 10.9), Noigen DH-0300 (RO$(C_2H_4O)_w$H, "R": alkyl which has 14 carbon atoms, w=2, HLB value is 4.0), Noigen YX-400 (RO$(C_2H_4O)_w$H, "R": alkyl which has 12 carbon atoms, w=40, HLB value is 18.1), Noigen EA-160 ($C_9H_{19}C_6H_4O(C_2H_4O)_w$H, w=16.8, HLB value is 15.4), (those described above are names of products manufactured by Dai-ichi Kogyo Seiyaku Co., Ltd.), and Emulgen 1108 (name of product manufactured by Kao Corporation, RO$(C_2H_4O)_w$H, "R": alkyl which has 11 carbon atoms, w=8, HLB value is 13.4).

One type of polyoxyalkylene alkyl ether may be used independently, and two or more types of polyoxyalkylene alkyl ether may be used. The content of polyoxyalkylene alkyl ether is not particularly limited, but may be 0.01 mass % to 0.50 mass %, for example, with respect to the total mass (100 mass %) of the ink composition.

In addition, it is preferable to consider the content of the AO adduct of acetylenic glycol in which the main chain has 12 or more carbon atoms for the content of polyoxyalkylene alkyl ether. The mass ratio (the former:the latter) between the content of polyoxyalkylene alkyl ether (the former) and the content of the AO adduct of acetylenic glycol in which the main chain has 12 or more carbon atoms (the latter) is preferably 0.10:1.0 to 1.0:1.0, and more preferably, 0.30:1.0 to 0.70:1.0. When the mass ratio is within this range, the AO adduct of acetylenic glycol in which the main chain has 12 or more carbon atoms is sufficiently solubilized, and it is possible to effectively prevent generation of aggregates at a time of combination and occurrence of irregularity in absorbability of the ink since the solubility is excellent.

In addition, it is preferable to consider the total content of the AO adduct of acetylenic glycol in which the main chain has 12 or more carbon atoms and acetylenic glycol in which the main chain has 10 or more carbon atoms for the content of polyoxyalkylene alkyl ether. The mass ratio (the former:the latter) between the content of polyoxyalkylene alkyl ether (the former) and the total content of the AO adduct of acetylenic glycol in which the main chain has 12 or more carbon atoms and acetylenic glycol in which the main chain has 10 or more carbon atoms (the latter) is preferably 0.10:1.0 to 0.5:1.0, and more preferably, 0.10:1.0 to 0.40:1.0. When the mass ratio is within this range, the acetylenic glycol-based compound is sufficiently solubilized and the solubility is excellent. Therefore, it is possible to effectively prevent the generation of aggregates at a time of combining polyoxyalkylene alkyl ether and acetylenic glycol-based compound, and the occurrence of irregularity in absorbability of the ink.

[Surfactant Other than Those Described Above]

The ink in the embodiment A may include a surfactant (hereinafter, referred to as "the other surfactant") other than those described above.

Coloring Agent

It is preferable that the ink in the embodiment A further include a coloring agent. Examples of the coloring agent are not particularly limited, and any of a dye and a pigment can be used. Examples of colors which are provided by the coloring agent include yellow, magenta, cyan, black, white, green, orange, red, blue, light yellow, light magenta, light yellow, light black, light green, light orange, light red, and light blue.

As the pigment, it is possible to use at least any one of an inorganic pigment and an organic pigment. Among these, examples of the inorganic pigment are not limited to those described below, but can include a titanium oxide, an iron oxide, calcium carbonate, barium sulfate, aluminium hydroxide, barium yellow, cadmium red, chrome yellow, carbon black, dark blue, and metal powders.

Examples of the above-described organic pigment are not limited to those described below, but can include an azo pigment, a polycyclic pigment, a nitro pigment, a nitroso pigment, and aniline black. Among the examples, at least any one of the azo pigment and the polycyclic pigment is preferable. Among these, examples of the azo pigment are not limited to those described below, but can include an azo lake pigment, an insoluble azo pigment, a condensed azo pigment, and a chelate azo pigment. Examples of the polycyclic pigment are not limited to those described below, but can include a phthalocyanine pigment, a perylene pigment, a perionone pigment, an anthraquinone pigment, a quinacridone pigment, a dioxazine pigment, an indigo pigment, a thioindigo pigment, an isoindolinone pigment, a quinophthalone pigment, an azomethine-based pigment, and a rhodamine B lake pigment.

A dispersion state of the pigment in a case where a pigment is used as the coloring agent is not particularly limited, but it is preferable that at least one of pigments among a pigment on which a surface treatment has been performed and a pigment which uses a dispersant be used. The above-described pigment on which a surface treatment has been performed is a pigment which directly or indirectly bonds and makes a hydrophilic group (carboxyl group, sulfonate group, or the like) on a pigment surface dispersible in an aqueous solvent by a physical treatment or a chemical treatment (hereinafter, referred to as a "self dispersion type pigment"). The pigment which uses the dispersant is a pigment which is dispersed by a surfactant or a resin (hereinafter, referred to as a "polymer dispersion type pigment"). A known substance can be used for both of the surfactant and the resin. In addition, the "polymer dispersion type pigment" can also include a pigment which is coated with the resin. The pigment which is coated with the resin can be obtained by an acid deposition method, a phase inversion emulsification method, and a mini-emulsion polymerization method.

In addition, as the dye, it is possible to use an oil-soluble dye or a water-soluble dye. Among these, examples of the oil-soluble dye are not limited to those described below, but can include a pigment which is classified as a disperse dye in a color index. Examples of the water-soluble dye are not limited to those described below, but can include each of dyes which are classified as an acid dye, a direct dye, a basic dye, a reactive dye, and an edible dye.

Examples of the above-described acid dye and edible dye are not limited to those described below, but can include: C. I. acid yellow 17, 23, 42, 44, 79, 142; C. I. acid red 1, 8, 13, 14, 18, 26, 27, 35, 37, 42, 52, 82, 87, 89, 92, 97, 106, 111, 114, 115, 134, 186, 249, 254, 289; C. I. acid blue 9, 29, 45, 92, 249; C. I. acid black 1, 2, 7, 24, 26, 94; C. I. food yellow 3, 4; C. I. food red 7, 9, 14; and C. I. food black 1, 2.

Examples of the direct dye are not limited to those described below, but can include: C. I. direct yellow 1, 12, 24, 26, 33, 44, 50, 86, 120, 132, 142, 144; C. I. direct red 1, 4, 9, 13, 17, 20, 28, 31, 39, 80, 81, 83, 89, 225, 227; C. I. direct orange 26, 29, 62, 102; C. I. direct blue 1, 2, 6, 15, 22, 25, 71, 76, 79, 86, 87, 90, 98, 163, 165, 199, 202; and C. I. direct black 19, 22, 32, 38, 51, 56, 71, 74, 75, 77, 154, 168, 171.

Examples of the basic dye are not limited to those described below, but can include: C. I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C. I. basic red, 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C. I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C. I. basic black 2, 8.

Examples of the reactive dye are not limited to those described below, but can include: C. I. reactive black 3, 4, 7, 11, 12, 17; C. I. reactive yellow 1, 5, 11, 13, 14, 20, 21, 22, 25, 40, 47, 51, 55, 65, 67; C. I. reactive red 1, 14, 17, 25, 26, 32, 37, 44, 46, 55, 60, 66, 74, 79, 96, 97; and C. I. reactive blue 1, 2, 7, 14, 15, 23, 32, 35, 38, 41, 63, 80, 95.

The content of the coloring agent is not particularly limited, and can be appropriately selected depending on a purpose. However, since chromogenic characteristics are excellent, the content of the coloring agent is preferably 2 mass % to 10 mass % with respect to the total mass (100 mass %) of the ink composition.

In addition, the ink composition of the embodiment A may be transparent clear ink which does not substantially include a coloring agent.

Water

The ink in the embodiment A may contain water. In particular, when the ink is aqueous ink, the water is a main solvent of the ink composition, and when the recording medium is heated in the ink jet recording, the water is a component which evaporates and is distributed.

Examples of water include pure water, such as ion exchanged water, ultrafiltration water, Milli Q water, or distilled water, and water in which ionic impurities are eliminated as much as possible, such as hyperpure water. In addition, when water which is sterilized by ultraviolet irradiation or addition of hydrogen peroxide is used, it is possible to prevent mold or bacteria from being generated when pigment dispersions and ink which use the same are stored for a long time.

The content of water is not particularly limited, but can be appropriately selected as necessary.

In addition, the ink which contains the water or the water-based organic solvent as the main solvent corresponds to the aqueous ink. Here, the "main solvent" refers to as a solvent component which has the highest content among all of the solvents in the ink composition. In addition, the "water-based organic solvent" in the specification means a mixed solvent of water and a water-soluble organic solvent.

Organic Solvent

It is preferable that the ink in the embodiment A further include an organic solvent. Among organic solvents, a volatile water-soluble organic solvent is preferable. Examples of the volatile water-soluble organic solvent are not limited to those described below, but can include an alcohol type solvent, such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, or tert-pentanol, or a glycol type solvent, N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetramethylurea.

One type of organic solvent may be used independently, and a combination of two or more types of organic solvent may be used. The content of the organic solvent is not particularly limited, and can be appropriately selected as necessary. For example, when the ink has an excellent penetrability into the recording medium, it is preferable to use one or more types of solvent which are selected from a group consisting of 1,2-hexanediol, triethylene glycol monobutyl ether, and dipropylene glycol monopropyl ether.

In addition, the sum content of the water and the organic solvent may be 60 mass % to 98 mass % with respect to the total mass (100 mass %) of the ink composition.

Other Components

In addition to the above-described materials, the ink composition of the embodiment A may include a pH adjuster, such as triethanolamine or tripropanolamine, a preservative and a fungicide, a rust preventive, or a chelating agent.

Method of Manufacturing Ink Composition

The ink composition of the embodiment A can be obtained by mixing the above-described materials (components) in an arbitrary order, performing filtration if necessary, and eliminating impurities. Here, at a time of mixing the AO adduct of acetylenic glycol in which the main chain has 12 or more carbon atoms, acetylenic glycol in which the main chain has 10 or more carbon atoms, and the above-described polyoxyalkylene alkyl ether, it is preferable that the temperature be 10° C. to 30° C.

In addition, it is preferable to mix in the pigment after adjusting to a state where the pigment is uniformly dispersed in the solvent in advance, since this is easy to handle.

As a method for mixing in each material, a method of mixing in by adding the materials in order into a container provided with a stirring apparatus, such as a mechanical stirrer or a magnetic stirrer, and stirring, is appropriately used. As a method of filtering, for example, it is possible to perform centrifugal filtration, filtration by using a filter, or the like, if necessary.

In this manner, according to the embodiment A, even in a case of an ink composition which is almost not deaerated (for example, dissolved nitrogen is equal to or greater than 5 ppm) and an ink composition which is not deaerated (for example, dissolved nitrogen is equal to or greater than 7 ppm) at all, it is possible to provide an ink composition which has excellent initial filling characteristics and continuous printing stability, and furthermore, which even has excellent dissolution stability and preservation stability. In other words, even without being deaerated, it is possible to provide an ink composition which can suppress the discharging failure and which has excellent initial filling characteristics and continuous printing stability. In other words, for example, even when bubbles are generated in the ink, it is possible to provide an ink composition in which the bubbles are easily eliminated.

Ink Jet Recording Method

The ink jet recording method according to one embodiment A of the present invention performs recording on a recording surface of a recording medium using the ink composition of the above-described embodiment A, and obtains a recorded matter.

Hereinafter, the recording medium which is used in the ink jet recording method (hereinafter, referred to as a "recording method") of the embodiment A will be described, and then, an example of the recording method will be described.

Recording Medium

Examples of the recording medium are not particularly limited, but can include a recording medium with ink absorbing properties. Examples of the recording medium with absorbing properties are not particularly limited, but can include a plain paper sheet, such as an electrophotographic paper sheet having a high penetrability of the aqueous ink, an ink jet paper sheet (an ink jet dedicated paper sheet which is provided with an ink absorbing layer made of silica particles or alumina particles, or an ink absorbing layer made of a hydrophilic polymer, such as polyvinyl alcohol(PVA) or polyvinylpyrrolidone(PVP)), an art paper sheet which is used in general offset printing having relatively low penetrability of the aqueous ink, a coated paper sheet, or a cast paper sheet.

Discharging Process

The ink jet recording method of the embodiment A includes a discharging process. In the discharging process, by the ink jet recording method, ink droplets of the ink composition are discharged onto the recording medium, and an image is formed. As a discharging method, known methods in the related art can be used. Among these methods, when a method (a recording method which uses a head that forms the ink droplets by mechanically deforming an electrostrictive element) of discharging the droplets by using vibration of a piezoelectric element is used, an excellent recording can be performed.

Embodiment B

Ink Supply System

One embodiment of the present invention relates to an ink supply system. The ink supply system includes: an ink storage container in which the atmosphere and the ink can be brought into contact with each other and which stores the ink; a print head which discharges the ink; an ink supply path which connects the ink storage container and the print head with each other and in which the ink flows to the print head from the ink storage container; and a filter (D) which is provided in the ink supply path. The ink contains an alkylene oxide adduct (A) (hereinafter, the alkylene oxide adduct is referred to as an "AO adduct") of acetylenic glycol in which a main chain has 12 or more carbon atoms and polyoxyalkylene alkyl ether (C).

The ink supply system of the embodiment B eliminates bubbles during the time when the ink including bubbles stored in the ink storage container reaches the print head (hereinafter, simply referred to as a "head") through the ink supply path. In particular, the AO adduct of acetylenic glycol in which the main chain has 12 or more carbon atoms gives the ink an excellent wettability, and incorporates the bubbles attached to members, such as the ink storage container or the ink supply path, into the ink. In addition, when the ink into which the bubbles are incorporated passes through the filter (D), the filter (D) captures the bubbles incorporated into the ink and eliminates the bubbles from the ink.

Ink Jet Recording Apparatus

One embodiment of the present invention relates to an ink jet recording apparatus (hereinafter, simply referred to as a "recording apparatus" or a "printer"). The ink supply system of the embodiment B can be executed by using the recording apparatus. In particular, the recording apparatus is provided with the above-described ink supply system, and performs the recording by discharging the ink supplied to the print head from the ink storage container, toward the recording medium from the print head. Therefore, hereinafter, the recording apparatus of the embodiment B is described in detail, and the ink supply system of the embodiment B will be described in detail.

The recording apparatus provided with the above-described ink supply system can be classified into several types according to a method of the recording apparatus and a supplying method of the ink. Examples of a type classified by the method of the recording apparatus can include a line printer and a serial printer. In short, the line printer is a printer which is provided with a line head having a length that corresponds to a width of the recording medium, in which the head is fixed (almost) without moving, and which performs printing by one pass (single pass). Meanwhile, the serial printer is a printer which performs printing generally by two or more passes (multi pass) while the head performs a reciprocating movement (shuttle movement) in a direction perpendicular to a transporting direction of the recording medium. In addition, examples of a type classified by the supplying method of the ink can include an on-carriage type serial printer and an off-carriage type serial printer. The on-carriage type serial printer, the off-carriage type serial printer, and the line printer will be described later.

Hereinafter, the ink supply system and the recording apparatus provided with the same will be described by using the off-carriage type serial printer as an example among the types above with reference to the drawings. Here, the off-carriage type serial printer is a printer which connects the ink storage container, such as an ink tank or an ink cartridge, and a head of the carriage with an ink supply path, such as a tube.

In addition, in each drawing used in the description below, in order to make each constituent element (members) have a recognizable size, the dimensions for every constituent element are appropriately modified. The embodiment B is not limited only to the number, shape, and size ratio of the constituent elements, and the relative positional relationship of each constituent element, which are illustrated in the drawings.

1. Configuration of Recording Apparatus

Figure 2:
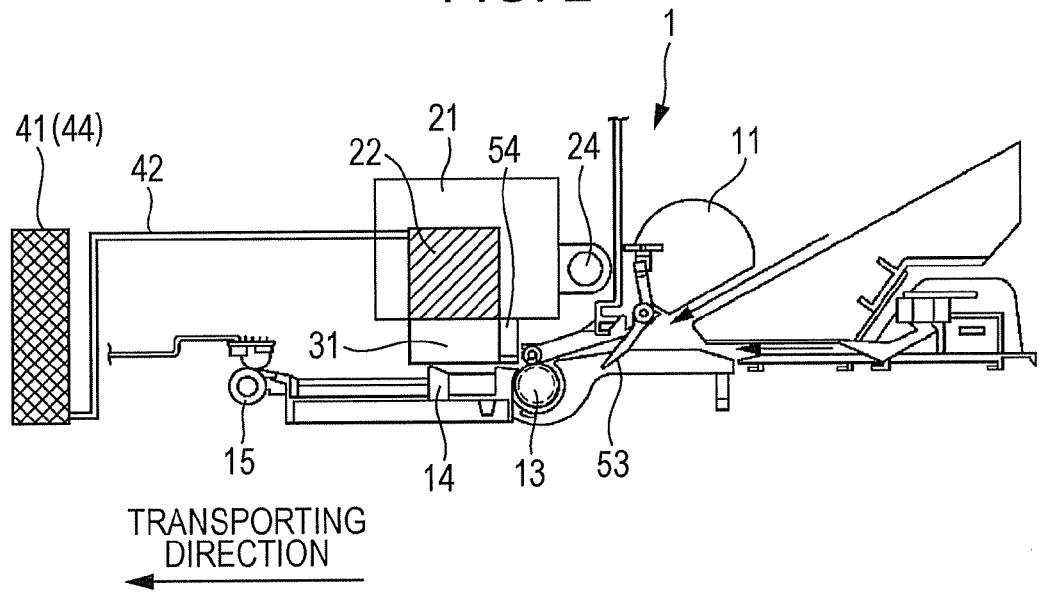
FIG. 2 is a schematic view illustrating a horizontal cross-section of the printer which is provided with the ink supply system.

FIG. 1 is a block diagram illustrating a configuration of a printer 1 which is provided with the ink supply system. FIG. 2 is a schematic view illustrating a horizontal cross-section of the printer 1 which is provided with the ink supply system.

The printer 1 of the embodiment B is an apparatus which forms an image on a recording surface of a recording medium by discharging ink toward a recording medium, such as a paper sheet. Here, the printer 1 of the embodiment B can form an image by using various colors of ink. For example, the image is formed by using 4 colors of ink, such as cyan, magenta, yellow, and black (hereinafter, each color is referred to as "C", "M", "Y", and "Bk"), or a base which gives excellent concealing properties to the recording medium by using white ink is formed. Furthermore, clear ink can be coated onto the CMYBk ink or the white ink, and accordingly, it is possible to improve glossiness.

The printer 1 includes a transport unit 10, a carriage unit 20, a head unit 30, an ink storage unit 40, a detector group 50, and a controller 60. The printer 1 which receives printing data from a computer 110 which is an external apparatus controls each unit (transport unit 10, carriage unit 20, head unit 30, ink storage unit 40) by the controller 60. The controller 60 controls each unit and prints the image on the recording medium, based on the printing data received from the computer 110. A situation in the printer 1 is monitored by the detector group 50, and the detector group 50 outputs a detection result to the controller 60. The controller 60 controls each unit based on the detection result output from the detector group 50.

The transport unit 10 is a unit for transporting the recording medium, such as the paper sheet, in a predetermined direction (hereinafter, referred to as a "transport direction" or a "sub-scanning direction"). The transport unit 10 includes a paper supply roller 11, a transport motor (not illustrated), a transport roller 13, a platen 14, and a paper ejection roller 15. The paper supply roller 11 is a roller for supplying the recording medium which is inserted into a paper insertion port, into the printer 1. The transport roller 13 is a roller for transporting the recording medium supplied by the paper supply roller 11 to an area where printing is possible, and is operated by the transport motor. The platen 14 supports the recording medium during printing. The paper ejection roller 15 is a roller for ejecting the recording medium to the outside of the printer 1, and is provided on a downstream side in the transporting direction with respect to the area where printing is possible.

The carriage unit 20 is a movement mechanism which moves, that is, scans a head 31 in a direction (hereinafter, referred to as a "movement direction" or a "main scanning direction") which intersects with the above-described transporting direction (sub-scanning direction) while discharging the ink, with respect to the recording medium which is made stationary in a recording area. The carriage unit 20 includes a carriage 21, a carriage motor (not illustrated), and a sub-tank (sub-ink tank) 22. The carriage 21 includes the sub-tank 22 and the head 31, and is connected to the carriage motor (not illustrated) via a timing belt (not illustrated). The carriage 21 performs the reciprocating movement along a guide shaft 24 through the carriage motor in a state of being supported by the guide shaft 24 which intersects with the transporting direction (to be described later). The guide shaft 24 is supported so that the carriage 21 can perform the reciprocating movement in a shaft line direction of the guide shaft 24. The sub-tank 22 is for suppressing a pressure change of the ink inside the head 31, which can be generated by the reciprocating movement of the carriage 21.

Although not illustrated in the drawings, the sub-tank 22 has four sub-tanks, for example, and may store different colors of ink, respectively. Specific examples of the four sub-tanks 22 can include a sub-tank which stores black ink, a sub-tank which stores cyan ink, a sub-tank which stores magenta ink, and a sub-tank which stores yellow ink. Any of the four sub-tanks 22 can be mounted on the carriage 21.

In addition, the carriage unit 20 may not be provided with the sub-tank 22. In this case, an ink storage container 41 and the head 31 are connected to each other via an ink supply path 42. The sub-tank 22 will be described in more detail in FIG. 3 which will be described later.

The head unit 30 is for discharging the ink onto the recording medium. The head unit 30 is provided with the head 31 having a plurality of nozzles. Since the head 31 is provided in the carriage 21, when the carriage 21 moves in the movement direction, the head 31 also moves in the movement direction. As the ink is discharged while the head 31 moves in the movement direction, an image is formed on the recording surface of the recording medium.

Although not illustrated in the drawings, for example, four heads 31 may discharge the inks which correspond to the colors stored in the above-described four sub-tanks 22. In other words, specific examples of the four heads 31 can include each head 31 for discharging each of the black ink, the cyan ink, the magenta ink, and the yellow ink.

The ink storage unit 40 stores the ink and supplies the stored ink to the head 31 via the ink supply path. The ink storage unit 40 includes the ink storage container 41, the ink supply path 42, and a filter 43.

The ink storage container 41 is mounted at a different position from the carriage 21, and is accommodated in an ink storage container accommodation portion (not illustrated) provided on an outer side (outside a movement range of the carriage 21) of a main body of the printer 1. The ink storage container 41 and the head 31 (carriage 21) are connected to each other by the ink supply path 42. In this case, the ink storage container 41 does not move.

The ink storage container 41 has a structure in which the atmosphere and the ink can be in contact. In other words, the ink supply system of the above-described embodiment B allows the ink stored in the ink storage container 41 to include bubbles. Therefore, according to the ink supply system and the recording apparatus of the embodiment B provided with the same, regardless of performing deaeration processing or not, it is possible to store the ink which includes bubbles and has high dissolved nitrogen, in the ink storage container 41. Furthermore, the ink storage container 41 makes it easy to supply more (replenish, refill) ink. Examples of the ink storage container 41 are not particularly limited if the container is a known container in the related art which can store the ink, but can include an ink tank (with a high capacity) and an open type ink cartridge. Therefore, the above-described ink supply system and recording apparatus exhibit an extremely excellent effect in such a type of printer as the off-carriage type serial printer.

Although not illustrated in the drawings, four ink storage containers 41 may store the inks which correspond to the colors stored in the four sub-tanks 22. In other words, specific examples of the four ink storage containers 41 can include each ink storage container 41 which stores the black ink, the cyan ink, the magenta ink, and the yellow ink, respectively. The level of the liquid surface of the inks can be confirmed for each ink storage container from a predetermined part, from the outside. In addition, the ink storage container 41 is one constituent element of the printer 1, but there is less space restriction since the ink storage container 41 is provided on the outside of the main body of the printer 1. Accordingly, it is possible to store a greater volume of ink than the sub-tank 22.

The ink supply path 42 is an ink flow path for connecting the ink storage container 41 and the head 31 to each other and for supplying the ink in the ink storage container 41 to the head 31. The ink supply path 42 can connect the ink storage container 41 which can store each color of ink and the sub-tank 22 for storing the ink having a corresponding color, to each other. The ink supply path 42 can be formed of a member having flexibility, such as synthetic rubber, and can be called a hose or a tube. When the ink is discharged from the head 31 and the ink of the sub-tank 22 is consumed, the ink in the ink storage container 41 is supplied to the sub-tank 22 via the ink supply path 42. Accordingly, the printer 1 can continue printing without a stopping operation for a long time.

In addition, the ink storage container 41 and the ink supply path 42 will be described in detail in FIG. 3 which will be described later.

The filter 43 is provided in the middle of the flow path of the ink supply path 42. When the ink which flows through the ink supply path 42 includes bubbles, the filter 43 can prevent the bubbles from flowing into the head by capturing the bubbles. Accordingly, both ink filling into the head 31 and ink discharging from the head 31 are performed excellently, and both initial filling characteristics and continuous printing stability become excellent.

An installation position of the filter 43 is not particularly limited, and for example, the filter 43 may be provided in the vicinity of an outlet (liquid outlet portion 306) of the ink storage container 41. In the tank, the bubbles are likely to be generated when the inside is filled with the ink or the ink is consumed. By suppressing the flow of the bubbles in the flow path, it is possible to make the initial filling characteristics and the continuous printing stability superior. In addition, a plurality of filters 43 may be provided. However, in order to maintain the flow of the ink well, the number of filters provided in the middle of one flow path is preferably 1 to 3, and 1 is more preferable.

In order to prevent nozzle omission caused by ejection of bubbles from the nozzle of the head 31, it is preferable that an average pore diameter of the filter 43 be equal to or less than a nozzle diameter of the nozzle of the head 31. The nozzle diameter is generally 10 μm to 30 μm. Here, the "average pore diameter of the filter" in the specification means that 50% of beads which has the same diameter as the average pore diameter can be eliminated. In addition, the "nozzle diameter" in the specification means a diameter of the most slender part in the nozzle.

Examples of a material of the filter 43 are not limited to those described below, but can include stainless steel (mesh), a resin (non-woven fabric, maps), such as polypropylene. Among these, it is preferable that the material of the filter 43 be a resin since it is easy to capture impurities, such as foreign substances that can be generated in the flow path, caused by the resin or rubber member which forms the tank or the tube. By capturing the impurities and the bubbles by the filter 43, it is possible to prevent impurities attached to bubbles or impurities from being carried to the nozzles of the head 31 independently and generating nozzle omission. In other words, by making the material of the filter 43 with the above-described preferable material, it is possible to make the initial filling characteristics and the continuous printing stability superior.

The detector group 50 includes a linear type encoder (not illustrated), a rotary type encoder (not illustrated), a paper detection sensor 53, and an optical sensor 54. The linear type encoder detects a position of the movement direction of the carriage 21. The rotary type encoder detects rotation of the transport roller 13. The paper detection sensor 53 detects a position of a tip end of the recording medium, such as the paper sheet, which is being supplied. The optical sensor 54 detects a presence or absence of the recording medium by a light emitting portion and a light receiving portion which are attached to the carriage 21. The optical sensor 54 can detect a position of an end portion of the recording medium while being moved by the carriage 21, and can detect a width of the recording medium. In addition, according to the situation, the optical sensor 54 can even detect the tip end (an end portion of a downstream side in the transporting direction, also called an "upper end") of the recording medium or a rear end (an end portion of an upstream side in the transporting direction, also called a "lower end") of the recording medium.

The controller 60 is a control unit (control portion) for performing control of the printer 1. The controller 60 includes an interface portion 61, a CPU 62, a memory 63, and a unit control circuit 64. The interface portion 61 performs transmitting and receiving of data between the computer 110 which is the external apparatus and the printer 1. The CPU 62 is an arithmetic processor for performing control of the entire printer 1. The memory 63 is for securing an area where programs of the CPU 62 are accommodated or an operation area, and has a memory element, such as a RAM or an EEPROM. The CPU 62 controls each unit via the unit control circuit 64 along the programs which are accommodated in the memory 63.

When performing the recording, by the control of the controller 60, a dot forming operation which discharges the ink from the head 31 while moving in the movement direction as described below and a transporting operation which transports the recording medium in the transporting direction, are alternately repeated, and it is possible to print an image made of a plurality of dots on the recording medium.

In this manner, the ink jet recording apparatus of the embodiment B provided with the above-described ink supply system forms an image in an area facing the head 31 of the recording medium.

2. Operation of Recording Apparatus

Examples of the operation of the recording apparatus of the embodiment B can include a recording operation which forms an image by attaching ink onto the recording medium and the transporting operation which transports the recording medium. The recording apparatus of the embodiment B performs the recording by alternately performing the recording operation and the transporting operation. During the recording, the recording medium is not transported and is in a state of being held on the platen 14 which is positioned in the recording area. Examples of the above-described recording operation are not limited to those described below, but can include an ink supplying operation which supplies ink from the ink storage container 41 to the head 31, an air introducing operation which introduces the atmospheric air (air) to the ink storage container 41 for supplying the ink stably to the head 31 from an ink tank 44, and a discharging operation which discharges the ink from the head 31 toward the recording medium. By the operation of the recording apparatus, it is possible to form a predetermined image in an area facing the head 31 on the recording medium.

In addition, the above-described ink supplying operation includes an operation which supplies more (replenishes) ink to the ink storage container 41 by as much as an amount of reduction after supply. In addition, the operation of the recording apparatus of the embodiment B can be called the ink jet recording method by using the ink supply system, and various operations including the above-described operations of the recording apparatus can be called a "process".

Hereinafter, the recording medium which is used in the recording operation in the embodiment B will be described, and then, an example of the recording operation will be described.

2-1. Recording Medium

Examples of the recording medium are not particularly limited, but can include a recording medium with ink absorbing properties. Examples of the recording medium with ink absorbing properties are not particularly limited, but can include a plain paper sheet, such as an electrophotographic paper sheet having a high penetrability of the aqueous ink, an ink jet paper sheet (an ink jet dedicated paper sheet which is provided with an ink absorbing layer made of silica particles and alumina particles, or an ink absorbing layer made of a hydrophilic polymer, such as polyvinyl alcohol (PVA) or polyvinylpyrrolidone (PVP)), an art paper sheet which is used in general offset printing having relatively low penetrability of the aqueous ink, a coated paper sheet, or a cast paper sheet.

2-2. Ink Supplying Operation

The recording operation in the embodiment B includes the ink supplying operation. The ink supplying operation supplies the ink to the head 31 from the ink storage container 41 and can use the above-described ink supply system of the embodiment B. The ink supply operation will be described in detail later.

2-3. Air Introducing Operation

The recording operation in the embodiment B may further include the air introducing operation. The air introducing operation assists the above-described ink supplying operation, and can use the above-described ink supply system of the embodiment B. For example, as described above, in the recording operation which uses the ink supply system provided with an air introducing flow path for introducing air and the ink storage container having a structure in which bubbles are generated in the ink, the air introducing operation is performed. The air introducing operation introduces the atmospheric air (air) to the ink storage container 41 in order to stably supply the ink to the head 31 from the ink tank 44. In addition, the air introducing operation will be described in detail later.

2-4. Discharging Operation

The recording operation in the embodiment B includes the discharging operation. In the ink jet recording method, the discharging operation discharges the ink droplets onto the recording medium, and forms an image. As the method of discharging, it is possible to use already known methods in the related art. Among the methods, when a method (a recording method which uses a head that forms the ink droplets by mechanically deforming an electrostrictive element) of discharging the droplets from the nozzle by using vibration of a piezoelectric element or a method of discharging the ink from the nozzle by using a heating unit and generating bubbles in the head are used, excellent recording can be performed. In addition, various discharging conditions, such as a discharging temperature, a discharging time, or a viscosity of the discharged ink, are not particularly limited.

Hereinafter, among the recording operations in the embodiment B, the ink supplying operation and the air introducing operation will be mainly described in detail.

Figure 3:
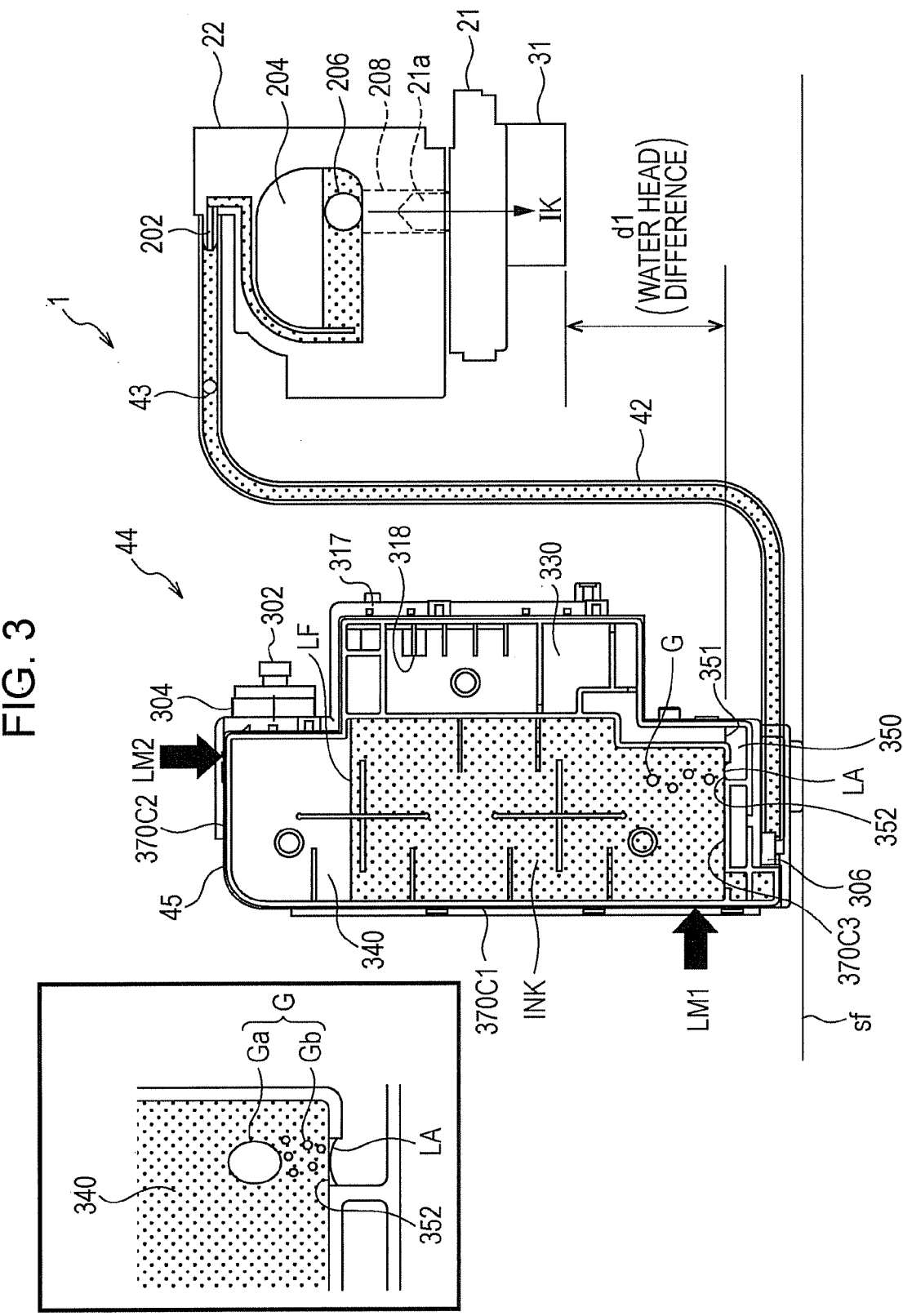
FIG. 3 is a schematic view for describing a principle of ink supply to a head from an ink tank which is an example of an ink storage container.

FIG. 3 is a schematic view for describing a principle of ink supply to the head 31 from the ink tank 44 which is an example of the ink storage container 41. A technique of ink supplying illustrated in FIG. 3 is, simply in other words, a technique which uses a principle of the Mariotte bottle. In the technique, as the head 31 and the ink tank 44 are connected to each other via the sub-tank 22 and the ink supply path 42 which are provided in the carriage 21, and negative pressure is generated inside the sub-tank 22, the ink is absorbed and supplied to the head 31 from the ink tank 44. FIG. 3 schematically illustrates mainly the inside of the ink tank 44, the ink supply path 42, and the sub-tank 22.

The printer 1 is installed on a predetermined horizontal surface sf. The liquid outlet portion 306 of the ink tank 44 and a liquid receiving portion 202 of the sub-tank 22 are connected to each other via the ink supply path 42.

The sub-tank 22 is molded using a synthetic resin, such as polystyrene or polyethylene. The sub-tank 22 includes an ink storage chamber 204, an ink flowing path 208, and a filter 206. An ink feeding needle 21a of the carriage 21 is inserted into the ink flowing path 208. When impurities, such as foreign substances, blend with the ink which flows through the ink flowing path 206, the filter 206 prevents the impurities from flowing into the head 31 by capturing the impurities. The ink of the ink storage chamber 204 flows through the ink flowing path 208 and the ink feeding needle 21a by the absorption of the head 31, and is supplied to the head 31. By being discharged and attached to the recording medium via the nozzle, the ink supplied to the head 31 forms an image (the above-described discharging operation).

Here, as described in the embodiment B, even when the sub-tank 22 is provided between the ink storage container 41 and the head 31, since the ink supply path 42 connects the ink storage container 41 and the head 31 to each other, the ink supply path 42 exists even in the sub-tank 22. For this reason, in the above-described case, any of the filter 43 and the filter 206 corresponds to the filter which is provided in ink supply path 42.

FIG. 3 is one preferable aspect in which the filter 206 is provided in the flow path in the sub-tank 22. Accordingly, since the collected bubbles remain in a space on the upper end of the sub-tank 22, closing of the flow path by the gathered bubbles is unlikely to happen. In addition, an aspect in which the filter 43 and the filter 206 are provided together as illustrated in FIG. 3 may be employed, and an aspect in which only the filter 206 is provided may be employed.

In addition, in another preferable aspect, by providing the filter 43 right in front (upstream side) of the head 31, it is possible to effectively collect the bubbles generated right in front (upstream side) of the head 31. For example, an aspect in which the filter is provided on the inside of the ink feeding needle 21a, where there is equipping of the sub-tank 22, can be employed. According to the aspect, it is possible to effectively collect the bubbles generated when attaching and detaching the cartridge. In addition, even in the aspect in which the filter is provided inside the ink feeding needle, it is possible to provide a plurality of filters.

The ink tank 44 supplies the ink to the head 31 of the printer 1 by using the principle of the Mariotte bottle. An outer surface of the ink tank 44 is made of a first wall 370C1, a second wall (upper surface wall) 370C2, and a lower surface wall 370C3. The ink tank 44 has the air introducing flow path and the ink flow path on the inside thereof. The air introducing flow path is a flow path for introducing the air to a liquid storage chamber 340 through an atmospheric air introduction port 318 via an atmosphere flow path (not illustrated) from an atmosphere opening port 317. The air introducing flow path is a flow path for performing a pouring (including "replenishment", the same applies to the following) of the ink to the liquid outlet portion 306 through the liquid storage chamber 340 from an ink flow path liquid pouring path 304.

First, the above-described air introducing flow path is a flow path which is used in the above-described air introducing operation. The air introducing flow path includes an atmosphere opening port 317 which is open to the outside (atmosphere), an air storage chamber 330 which has the atmospheric air introduction port 318 as one end thereof and an air chamber side opening 351 as the other end thereof, and a liquid chamber communication path 350 which has the air chamber side opening 351 as one end thereof and an air introducing port 352 as the other end thereof. The atmosphere opening port 317 communicates with the atmosphere, the air storage chamber 330 opens in the atmospheric air introduction port 318 which is one end thereof, and the atmosphere opening port 317 and the atmospheric air introduction port 318 communicate with each other via the flow path (not illustrated). In other words, the air storage chamber 330 communicates with the outside (atmosphere). In the liquid chamber communication path 350, the air chamber side opening 351 which is one end thereof opens in the air storage chamber 330, and the air introducing port 352 which is the other end thereof opens in the liquid storage chamber 340. In other words, the air storage chamber 330 communicates with the liquid storage chamber 340. In addition, it is preferable that the liquid chamber communication path 350 have a small flow path cross-sectional area which can form a meniscus (liquid surface cross-linking).

In this manner, in the above-described air introducing flow path, the air introducing port 352 which is one end thereof opens in the liquid storage chamber 340, and the atmosphere opening port 317 which is the other end thereof is open to the outside. In other words, in a state where the ink tank 44 which will be described later is in a use state, a liquid surface which is directly in contact with the atmosphere is formed in the liquid chamber communication path 350 (specifically, in the vicinity of the air introducing port 352), and the air (bubbles G) is introduced into the liquid storage chamber 340 as the air (bubbles) is introduced into the ink of the liquid storage chamber 340 from the air introducing port 352. Accordingly, as described later, it is possible to stably supply the ink to the head 31 from the ink tank 44. In other words, the air introducing operation which has been described up to here is performed for stabilizing the ink supplying operation which will be described later.

Meanwhile, the above-described ink flow path is used in the above-described ink supplying operation. The ink supplying operation is performed according to the reduction of an amount of stored ink in the ink tank 44 caused by the discharging operation from the head 31, and is performed more stably by the above-described air introducing operation.

Here, the ink tank 44 has a use state and a pouring state. The "use state" is a state of the ink tank 44 which is installed on the horizontal surface when the ink is supplied to the head 31 of the printer 1. In other words, in the use state, the liquid pouring path 304 is open in a horizontal direction (but, the opening is closed by a plug member 302). FIG. 3 illustrates the ink tank 44 in the use state. In addition, in the use state, the liquid storage chamber 340 and the air storage chamber 330 are arranged in parallel in the horizontal direction. Furthermore, in the use state, the air introducing port 352 is positioned below the liquid surface of the liquid which is stored in the liquid storage chamber 340. Meanwhile, the "pouring state" is a state of the ink tank 44 which is installed on the horizontal surface when the ink is injected into the ink tank 44. In other words, in the pouring state, the liquid pouring path 304 is open upward. In addition, in the pouring state, the liquid storage chamber 340 and the air storage chamber 330 are arranged in parallel in a vertical direction. Furthermore, in the pouring state, the air introducing port 352 is positioned above the liquid surface of the liquid which is stored in the liquid storage chamber 340 when a liquid volume at a time when the liquid surface of the liquid stored in the liquid storage chamber 340 is on a straight line LM1 in the use state ("first state display line LM1") is stored in the liquid storage chamber 340.

In the above-described pouring state, when an ink liquid surface reaches the vicinity of a straight light LM2 ("second state display line LM2 38 ) which is horizontal in the pouring state, a user may stop the replenishment of the ink. After the ink is poured into the liquid storage chamber 340 from the liquid pouring path 304 in this manner, the liquid pouring path 304 is sealed by the plug member 302. Furthermore, the liquid storage chamber 340 is maintained at negative pressure as the ink of the liquid storage chamber 340 is absorbed from the head 31.

In the above-described use state, the air introducing port 352 is positioned on a lower side of the first state display line LM1. The air introducing port 352 in FIG. 3 is formed on the lower surface wall 370C3 which interposes the liquid storage chamber 340 and is positioned on the lower side in the use state, in a container main body 45 which partitioned and forms the liquid storage chamber 340. Accordingly, even when the ink of the liquid storage chamber 340 is consumed, and the liquid surface of the liquid storage chamber 340 lowers, a liquid surface (atmosphere contact liquid surface) LA which is in contact with the atmosphere maintains a certain height for a long time (time for the ink liquid surface to reach the first state display line LM1). In addition, in the use state, the air introducing port 352 is disposed to be at a position which is lower than the head 31. Accordingly, a water head difference d1 is generated. In addition, in the use state, hereinafter, the water head difference d1 in a state where the atmosphere contact liquid surface LA which is the meniscus in the vicinity of the air introducing port 352 of the liquid chamber communication path 350 is formed is called a "steady state water head difference d1".

As the ink of the ink storage chamber 204 is absorbed by the head 31, the ink storage chamber 204 has equal to or higher than predetermined negative pressure. When the ink storage chamber 204 has equal to or higher than predetermined negative pressure, the ink of the liquid storage chamber 340 is supplied to the ink storage chamber 204 via the ink supply path 42. In other words, more ink in an amount flowing out to the head 31 is automatically supplied (replenished) from the liquid storage chamber 340 to the ink storage chamber 204. In other words, an absorption power (negative pressure) from the head 31 side is greater than the water head difference d1 which is generated by a difference of heights in the vertical direction between the air storage chamber 330 in the ink tank 44, that is, the atmosphere contact liquid surface (ink liquid surface) LA which is in contact with the atmosphere and a nozzle surface of the head 31, to a certain extent. As a result, the ink is supplied to the ink storage chamber 204 from the liquid storage chamber 340.

When the ink of the liquid storage chamber 340 is consumed, the air of the air storage chamber 330 is introduced as the bubbles G to the liquid storage chamber 340 via the liquid chamber communication path 350. In other words, in the liquid storage chamber 340 of the ink tank 44, the atmosphere which is introduced through the above-described air introducing flow path comes in contact with the ink poured through the above-described ink flow path. Accordingly, an ink liquid surface LF of the liquid storage chamber 340 lowers. Meanwhile, since a height of the atmosphere contact liquid surface LA which is in contact with the atmosphere is maintained to be constant, the water head difference d1 is maintained to be constant. In other words, by a predetermined absorption force of the head 31, it is possible to stably provide the ink to the head 31 from the ink tank 44 from the viewpoint of an ink amount.

In this manner, the ink tank 44 can stably supply the ink, but a problem occurs in that a part of the bubbles G flows out to the liquid outlet portion 306 together with the ink and carried to the head 31, and a failure, such as dot omission, can be generated. In detail, as illustrated in the drawing surrounded by a square on an upper left side of FIG. 3, when the bubbles G are generated in the ink from the air introducing port 352, there is a case where the bubbles G split and microbubbles Gb are generated which are considerably small with respect to a size of the air introducing port 352, regardless of a bubble Ga which has a size that is generally assumed. In the ink tank 44, the microbubbles Gb have a diameter of an extent of several+ μm, for example. A buoyancy of the microbubbles Gb is small (for example, 0.1 mm/s), and in particular, is likely to be influenced by the flow of the ink of the liquid storage chamber 340. When continuous printing is performed by using a high Duty of the printer 1, the microbubbles Gb flow into the head 31 side of the printer 1 via the liquid outlet portion 306 along the flow of the ink, and a failure, such as dot omission, is likely to occur.

Here, as a result of further examination of the inventors, it was found that it is possible to capture the microbubbles Gb included in the ink by the filter 43 and to prevent the microbubbles Gb from flowing into the head 31, by providing the filter 43 in the middle of the flow path of the ink supply path 42 and making the ink composition a predetermined composition. Accordingly, the above-described ink supply system of the embodiment B and the recording apparatus of the embodiment B provided with the same can be excellent in discharging, and can have excellent continuous printing stability.

Furthermore, in the off-carriage type serial printer, a failure, such as dot omission, is likely to occur, which is caused by an ink supply container, such as the ink tank 44 having a structure in which the atmospheric air introduced from the outside comes into contact with the ink for stabilizing the ink supplying. Therefore, when the above-described ink supply system and the recording apparatus provided with the same are employed in the off-carriage type serial printer, the ink which will be described later actively takes in the bubbles attached to members, such as the ink storage container 41 or the ink supply path 42, and can include the bubbles, such as the microbubbles Gb, which are not preferable. However, when the ink in which the bubbles are incorporated passes through the filter 43 of the ink supply path 42, the filter 43 captures the bubbles taken in by the ink, and the bubbles can be eliminated from the ink. For this reason, the ink which does not include the bubbles is supplied to the head 31, and thus, it is possible to prevent a failure, such as dot omission, from occurring. Therefore, when the above-described ink supply system and the recording apparatus provided with the same are employed in the off-carriage type serial printer, an extremely excellent effect is achieved.

3. Modification Example

Specific examples of the above-described ink supply system of the embodiment B and the recording apparatus provided with the same of the embodiment B are not limited to the description up to here, and it is possible to apply various changes without departing from the scope of the present invention. For example, a modification example as follows can be given.

In the recording apparatus of the embodiment B, the ink may not be absorbed and supplied to the head 31 from the ink tank 44 as the negative pressure is generated inside the sub-tank 22, and the ink may be supplied to the head 31 by applying pressure by a pump from the ink tank 44. In addition, as described above, without providing the sub-tank 22, the ink tank 44 and the head 31 may be connected to each other via the ink supply path 42.

In addition, a type of the recording apparatus of the embodiment B may be the on-carriage type serial printer which has the ink cartridge (ink tank, not illustrated) together with the head 31 on the carriage 21. In a case of the on-carriage type, the carriage 21 holds the ink cartridge (not illustrated) which stores the ink, which is detachable. In particular, when the ink cartridge (not illustrated) has an open type structure so that an inflow of the atmospheric air is not blocked, the above-described ink supply system and the recording apparatus provided with the same achieves a notably great effect. In addition, the ink cartridge (not illustrated) in the on-carriage type serial printer may have the same structure as the above-described sub-tank 22.

In addition, the on-carriage type serial printer may install more high-capacity ink tanks (not illustrated) on the outside thereof. The high-capacity ink tank can be connected with the above-described ink cartridge via the ink supply path (not illustrated). Accordingly, the storage amount of the ink can be increased drastically. In addition, the high-capacity ink tank and the ink supply path may have the same structure as the above-described ink tank 44 and the ink supply path 42. When more ink tanks are installed on the outside, since the same problem as the problem caused by the above-described ink tank 44 can occur, the above-described ink supply system and the recording apparatus provided with the same achieve a notably great effect.

In addition, the recording apparatus of the embodiment B may be a line printer.

In this manner, according to the above-described embodiment B and the modification example, even in a case of ink (dissolved nitrogen is equal to or higher than 5 ppm, for example) which includes bubbles, it is possible to provide an ink supply system and an ink jet recording apparatus provided with the same which have excellent initial filling characteristics and continuous printing stability.

Ink

One embodiment of the present invention relates to the ink. The ink is used in the above-described ink supply system of the embodiment B and the ink jet recording apparatus provided with the same. The ink includes the alkylene oxide adduct (A) of acetylenic glycol in which the main chain has 12 or more carbon atoms, and polyoxyalkylene alkyl ether (C). The AO adduct of acetylenic glycol in which the main chain has 12 or more carbon atoms included in the ink gives the ink an excellent wettability, and takes bubbles attached to surfaces of members, such as the ink storage container or the ink supply path, into the ink. In addition, the above-described filter captures the bubbles taken into the ink and eliminates the bubbles from the ink.

Hereinafter, additives (components) which are included or can be included in the ink of the embodiment B will be described.

Alkylene Oxide Adduct (A) of Acetylenic Glycol in which Main Chain has 12 or More Carbon Atoms The ink composition of the embodiment B includes the alkylene oxide adduct (A) of acetylenic glycol in which the main chain has 12 or more carbon atoms in the above-described embodiment A. Therefore, specific examples or a preferable content are also the same as in a case of the above-described embodiment A.

Polyoxyalkylene Alkyl Ether (C)

The ink of the embodiment B includes polyoxyalkylene alkyl ether (C) in the above-described embodiment A. Therefore, specific examples or a preferable content are also the same as in a case of the above-described embodiment A.

Surfactant Other than Those Described Above

The ink in the embodiment B may include a surfactant (hereinafter, referred to as "the other surfactant") other than those described above.

Acetylenic Glycol (B) in which Main Chain has 10 or More Carbon Atoms

It is preferable that the ink of the embodiment B include acetylenic glycol (B) in which the main chain has 10 or more carbon atoms in the above-described embodiment A. Among the acetylenic glycol-based surfactants, acetylenic glycol in which the main chain has 10 or more carbon atoms can effectively eliminate the bubbles generated in the ink. Accordingly, the initial filling characteristics and the continuous printing stability becomes superior. In addition, specific examples or a preferable content are also the same as in a case of the above-described embodiment A.

Coloring Agent

It is preferable that the ink in the embodiment B further include a coloring agent. The specific examples or a preferable content are the same as in the above-described embodiment A.

Water

The ink in the embodiment B may contain water. The specific examples or a preferable content are the same as in the above-described embodiment A.

Organic Solvent

It is preferable that the ink in the embodiment B further include an organic solvent. The specific examples or a preferable content are the same as in the above-described embodiment A.

Other Components

In addition to the above-described materials, the ink of the embodiment B may further include a pH adjuster, such as triethanolamine or tripropanolamine, a preservative and a fungicide, a rust preventive, or a chelating agent.

Method of Manufacturing Ink

The ink of the embodiment B can be manufactured in the same manner as in a case of the above-described embodiment A.

In this manner, according to the embodiment B, it is possible to appropriately use the ink supply system and the ink jet recording apparatus provided with the same which have excellent initial filling characteristics and continuous printing stability, and furthermore, to provide ink which is excellent in dissolution stability and preservation stability.

EXAMPLES

Hereinafter, examples of the present invention will be described in detail, but the present invention is not limited thereto.

Example A

Materials Used

Main materials used in the examples and comparative examples below are as follows.

Dye
  C. I. direct blue 199 (hereinafter, described as a "blue dye")

Surfactant
1. Alkylene Oxide Adduct of Acetylenic Glycol in which Main Chain has 12 or More Carbon Atoms
   Surfactant 1 (12 carbon atoms in the main chain, ethylene oxide is added, 2,5,8,11-tetramethyl-6-dodecyne-5,8-diol ethoxylate)
2. Acetylenic Glycol in which Main Chain has 10 or More Carbon Atoms
   Surfactant 2 (12 carbon atoms in the main chain, ethylene oxide is not added, 2,5,8,11-tetramethyl-6-dodecyne-5,8-diol)
   Surfactant 3 (10 carbon atoms in the main chain, ethylene oxide is not added, 2,4,7,9-tetramethyl-5-decyne-4,7-diol)
3. Other Acetylenic Glycol-Based Compounds
   Surfactant 4 (10 carbon atoms in the main chain, the number of additional moles of ethylene oxide is 10, 2,4,7,9-tetramethyl-5-decyne-4,7-diol ethoxylate)
   Surfactant 5 (10 carbon atoms in the main chain, the number of additional moles of ethylene oxide is 4, 2,4,7,9-tetramethyl-5-decyne-4,7-diol ethoxylate)
   Surfactant 6 (8 carbon atoms in the main chain, ethylene oxide is not added, 3,6-dimethyl-4-octyne-3,6-diol)

Polyoxyalkylene Alkyl Ether
  Polyoxyalkylene alkyl ether 1 (HLB value is 15.0, hereinafter, referred to as a "POAAE1")
  In addition, a chemical formula of the POAAE1 is illustrated below.

$$RO(C_2H_4O)_w(C_3H_6O)_x(C_2H_4O)_y(C_3H_6O)_zH$$

In the above-described chemical formula, R is alkyl which has 12 carbon atoms, $w+y=15$, and $x+z=4$.

Polyoxyalkylene alkyl ether 2 (HLB value is 12.0, hereinafter, referred to as a "POAAE2")
  In addition, a chemical formula of the POAAE2 is illustrated below.

$$RO(C_2H_4O)_w(C_3H_6O)_xH$$

In the above-described chemical formula, R is alkyl which has 12 carbon atoms, $w=7$, and $x=5$.

Polyoxyalkylene alkyl ether 3 (HLB value is 10.9, hereinafter, referred to as a "POAAE3")
  In addition, a chemical formula of the POAAE3 is illustrated below.

$$RO(C_2H_4O)_w(C_3H_6O)_xH$$

In the above-described chemical formula, R is alkyl which has 12 carbon atoms, $w=5$, and $x=4$.

Organic Solvent
  Triethylene glycol
  Triethylene glycol monobutyl ether (hereinafter, referred to as "TEGmBE")
  Propylene glycol
  Dipropylene glycol
  Glycerin
  Triethanolamine

Examples 1A to 9A, Comparative Examples 1A to 8A, Reference Examples 1A to 2A Each ink composition was prepared according to the composition illustrated in Table 1 and Table 2 described below by mixing in each component and stirring. In addition, miscellaneous materials were removed from each ink composition by filtering with a membrane filter having a pore diameter of 1 μm. In addition, in Table 1 and Table 2 shown below, the unit of the numeric values is mass %, and the sum is 100.00 mass %.

TABLE 1

Table 1

| Component | Example No. | | | | | | | | |
|---|---|---|---|---|---|---|---|---|---|
| | 1A | 2A | 3A | 4A | 5A | 6A | 7A | 8A | 9A |
| Blue dye | 4 | 4 | 4 | 4 | 4 | 4 | 4 | 4 | 4 |
| Triethylene glycol | 10 | 10 | 10 | 10 | 10 | 10 | 10 | 10 | 10 |
| TEGmBE | 8 | 8 | 8 | 8 | 8 | 8 | 8 | 8 | 8 |
| Propylene glycol | 1 | 1 | 1 | 1 | 1 | 1 | 1 | 1 | 1 |
| Dipropylene glycol | 1 | 1 | 1 | 1 | 1 | 1 | 1 | 1 | 1 |
| Glycerin | 10 | 10 | 10 | 10 | 10 | 10 | 10 | 10 | 10 |
| Triethanolamine | 0.5 | 0.5 | 0.5 | 0.5 | 0.5 | 0.5 | 0.5 | 0.5 | 0.5 |
| Surfactant 1 | 0.1 | 0.1 | 0.1 | 0.1 | 0.1 | 0.3 | 0.3 | 0.4 | 0.3 |
| Surfactant 2 | 0.1 | 0.1 | 0.1 | — | — | 0.1 | 0.3 | 0.3 | 0.4 |
| Surfactant 3 | — | — | — | 0.1 | 0.1 | — | — | — | — |
| Surfactant 4 | — | — | — | — | — | — | — | — | — |
| Surfactant 5 | — | — | — | — | — | — | — | — | — |
| Surfactant 6 | — | — | — | — | — | — | — | — | — |
| POAAE1 | 0.05 | — | — | 0.05 | — | 0.05 | 0.3 | 0.3 | 0.3 |
| POAAE2 | — | 0.05 | — | — | 0.05 | — | — | — | — |
| POAAE3 | — | — | 0.05 | — | — | — | — | — | — |
| Ion exchanged water | Residual quantity | Residual quantity | Residual quantity | Residual quantity | Residual quantity | Residual quantity | Residual quantity | Residual quantity | Residual quantity |
| Sum | 100.00 | 100.00 | 100.00 | 100.00 | 100.00 | 100.00 | 100.00 | 100.00 | 100.00 |

TABLE 2

Table 2

| | Comparative example and reference example No. | | | | | | | | | |
|---|---|---|---|---|---|---|---|---|---|---|
| | Comparative example | | | | | | | | Reference example | |
| Component | 1A | 2A | 3A | 4A | 5A | 6A | 7A | 8A | 1A | 2A |
| Blue dye | 4 | 4 | 4 | 4 | 4 | 4 | 4 | 4 | 4 | 4 |
| Triethylene glycol | 10 | 10 | 10 | 10 | 10 | 10 | 10 | 10 | 10 | 10 |
| TEGmBE | 8 | 8 | 8 | 8 | 8 | 8 | 8 | 8 | 8 | 8 |
| Propylene glycol | 1 | 1 | 1 | 1 | 1 | 1 | 1 | 1 | 1 | 1 |
| Dipropylene glycol | 1 | 1 | 1 | 1 | 1 | 1 | 1 | 1 | 1 | 1 |
| Glycerin | 10 | 10 | 10 | 10 | 10 | 10 | 10 | 10 | 10 | 10 |
| Triethanolamine | 0.5 | 0.5 | 0.5 | 0.5 | 0.5 | 0.5 | 0.5 | 0.5 | 0.5 | 0.5 |
| Surfactant 1 | 0.1 | — | — | 0.1 | 0.1 | 0.1 | — | — | — | — |
| Surfactant 2 | — | 0.1 | — | 0.1 | — | — | 0.1 | — | — | — |
| Surfactant 3 | — | — | — | — | — | — | — | 0.1 | 0.1 | 0.1 |
| Surfactant 4 | — | — | — | — | — | — | — | 0.1 | 0.1 | 0.1 |
| Surfactant 5 | — | — | — | — | — | — | 0.1 | — | — | — |
| Surfactant 6 | — | — | — | — | — | 0.1 | — | — | — | — |
| POAAE1 | — | — | 0.05 | — | 0.05 | 0.05 | 0.05 | 0.05 | 0.05 | 0.05 |
| POAAE2 | — | — | — | — | — | — | — | — | — | — |
| POAAE3 | — | — | — | — | — | — | — | — | — | — |
| Ion exchanged water | Residual quantity | Residual quantity | Residual quantity | Residual quantity | Residual quantity | Residual quantity | Residual quantity | Residual quantity | Residual quantity | Residual quantity |
| Sum | 100.00 | 100.00 | 100.00 | 100.00 | 100.00 | 100.00 | 100.00 | 100.00 | 100.00 | 100.00 |

Measurement and Evaluation Methods

1A. Measurement of Dissolved Nitrogen of Ink

Dissolved nitrogen was measured by using a 6890N Network GC manufactured by Agilent Technologies. The measurement results are illustrated in Table 3 described below.

Here, the deaeration processing was performed only with respect to each of ink compositions of the reference examples, and was not performed with respect to each of ink compositions of the examples and the comparative examples. The deaeration processing in the reference examples used a chamber type vacuum deaeration apparatus which is available on the market, and adjusts the deaeration time. Accordingly, each of inks that had different dissolved nitrogen from each of others was prepared.

In addition, the "dissolved nitrogen" in Table 3 shown below represents an amount of nitrogen which is dissolved in the ink composition, and the unit thereof is ppm.

2A. Evaluation of Dissolution Stability

A visual observation on the each prepared ink composition was performed to check whether the material components were dissolved (dispersed) uniformly or not.

Evaluation standards were as follows. The evaluation results are illustrated in Table 3 shown below.

B: Raw material components of the ink were dissolved (dispersed) uniformly, and undissolved floating materials were not observed.

D: Raw material components of the ink were not dissolved (dispersed), and undissolved floating materials were observed.

3A. Evaluation of Preservation Stability

Each prepared ink composition was divided by a 20 ml glass bottle with a lid, and was left for one week at 70° C. The liquid surface of the ink was observed, and presence or absence of floating materials was visually checked. Furthermore, when the ink was filtered with a filter having a pore diameter of 10 μm, the presence or absence of collected materials (filtered materials) was checked.

Evaluation standards were as follows. The evaluation results are illustrated in Table 3 shown below.

B: Floating materials derived from the ink components were not observed, and collected materials were not obtained.

C: Floating materials derived from the ink components were observed, but collected materials were not obtained (practically no problem).

D: Collected materials were obtained.

4A. Evaluation of Initial Filling Characteristics

The ink tank of an ink jet printer (L100 [name of product], manufactured by Seiko Epson Corporation) was filled with the each prepared ink composition. An initial filling operation was performed to the head according to an initial filling sequence determined by L100. After that, in order to check whether or not the ink was discharged from all of the nozzles of the head, a nozzle check was performed. When there are nozzles which could not discharge ink, a cleaning (absorption of the ink in the nozzles) of the head was performed, and after that, the nozzle check was performed again. Based on the number of times of cleaning required until the ink could be discharged from all of the nozzles, the initial filling characteristics were evaluated according to the following evaluation standards. The evaluation results are illustrated in Table 3 shown below.

B: The ink was discharged from all of the nozzles simply by the initial filling sequence.

C: The number of times of cleaning required until the ink could be discharged from all of the nozzles was 1.

D: The number of times of cleaning required until the ink could be discharged from all of the nozzles was 2.

5A. Evaluation of Continuous Printing Stability

According to the above-described "4A. Evaluation of initial filling characteristics", after confirming that the ink could be discharged from all of the nozzles of the head, when an image of 70% Duty was printed by using each ink composition and a plain paper sheet (P paper sheet [name of product], manufactured by Fuji Xerox Co., Ltd.) of A4 size, the evaluation of continuous printing stability was performed. The total number of printed paper sheets was 1,000 since the continuous printing with 500 paper sheets was performed twice. After that, the nozzle check was performed, and the continuous printing stability was evaluated by the following evaluation standards, based on the number of times of nozzle omission. The evaluation results are illustrated in Table 3 shown below.

B: The number of times of generation of nozzle omission was 1 or less.
C: The number of times of generation of nozzle omission was 2.
D: The number of times of generation of nozzle omission was 3 or more.

TABLE 3

Table 3

| | Example No. | | | | | | | | | | | | | | | | | | |
|---|---|---|---|---|---|---|---|---|---|---|---|---|---|---|---|---|---|---|---|
| | Example | | | | | | | | | Comparative example | | | | | | | | Reference example | |
| Items | 1A | 2A | 3A | 4A | 5A | 6A | 7A | 8A | 9A | 1A | 2A | 3A | 4A | 5A | 6A | 7A | 8A | 1A | 2A |
| Dissolved nitrogen | 8.7 | 8.2 | 7.7 | 7.8 | 8.3 | 8.7 | 8.7 | 8.7 | 8.7 | 8.1 | 8.2 | 8.2 | 8.4 | 8.4 | 8.0 | 8.3 | 7.9 | 5.5 | 1.4 |
| Dissolution stability | B | B | B | B | B | B | B | B | B | D | D | B | D | B | B | B | B | B | B |
| Preservation stability | B | B | B | B | B | B | B | C | C | D | D | B | D | B | D | B | B | B | B |
| Initial filling characteristics | B | B | C | B | B | B | B | B | B | D | D | D | D | D | D | D | D | C | B |
| Continuous printing stability | B | B | C | B | B | C | B | B | B | D | D | D | D | D | D | D | D | C | B |

According to the results in Table 3 shown above, it was found that the ink composition (each example) including the alkylene oxide adduct (A) of acetylenic glycol in which the main chain has 12 or more carbon atoms, acetylenic glycol (B) in which the main chain has 10 or more carbon atoms, and polyoxyalkylene alkyl ether (C) has excellent initial filling characteristics and continuous printing stability, and even has excellent dissolution stability and a preservation stability, compared to the ink composition (each comparative example) which does not include alkylene oxide adduct (A), acetylenic glycol (B), and polyoxyalkylene alkyl ether (C). In addition, in all of the above-described examples, the deaeration was not performed at all, but it was found that the ink composition (each comparative example) is the same or superior in any one of the initial filling characteristics, the continuous printing stability, the dissolution stability, and the preservation stability compared with the ink composition (each reference example, the ink composition itself corresponds to the comparative example) in which the deaeration processing was performed.

Example B

Materials Used
Main materials used in the examples and comparative examples below were as follows.
Pigment
  C. I. direct blue 199
Surfactant
1. Alkylene Oxide Adduct of Acetylenic Glycol in which Main Chain has 12 or More Carbon Atoms
  Surfactant 1 (12 carbon atoms in the main chain, ethylene oxide is added, 2,5,8,11-tetramethyl-6-dodecyne-5,8-diol ethoxylate)
2. Acetylenic Glycol in which Main Chain has 10 or More Carbon Atoms
  Surfactant 2 (12 carbon atoms in the main chain, ethylene oxide is not added, 2,5,8,11-tetramethyl-6-dodecyne-5,8-diol)
  Surfactant 3 (10 carbon atoms in the main chain, ethylene oxide is not added, 2,4,7,9-tetramethyl-5-decyne-4,7-diol)
3. Other Acetylenic Glycol-Based Compounds Surfactant 4 (10 carbon atoms in the main chain, the number of additional moles of ethylene oxide is 10, 2,4,7,9-tetramethyl-5-decyne-4,7-diol ethoxylate)
  Surfactant 5 (10 carbon atoms in the main chain, the number of additional moles of ethylene oxide is 4, 2,4,7,9-tetramethyl-5-decyne-4,7-diol ethoxylate)
Polyoxyalkylene Alkyl Ether
  Polyoxyalkylene alkyl ether 1 (HLB value is 15.0, hereinafter, referred to as a "POAAE1")
  In addition, a chemical formula of the POAAE1 is illustrated below.

$RO(C_2H_4O)_w(C_3H_6O)_x(C_2H_4O)_y(C_3H_6O)_zH$

In the above-described chemical formula, R is alkyl which has 12 carbon atoms, w+y=15, and x+z=4.
  Polyoxyalkylene alkyl ether 2 (HLB value is 12.0, hereinafter, referred to as a "POAAE2")
  In addition, a chemical formula of the POAAE2 is illustrated below.

$RO(C_2H_4O)_w(C_3H_6O)_xH$

In the above-described chemical formula, R is alkyl which has 12 carbon atoms, w=7, and x=5.
  Polyoxyalkylene alkyl ether 3 (HLB value is 10.9, hereinafter, referred to as a "POAAE3")
  In addition, a chemical formula of the POAAE3 is illustrated below.

$RO(C_2H_4O)_w(C_3H_6O)_xH$

In the above-described chemical formula, R is alkyl which has 12 carbon atoms, w=5, and x=4.
Organic Solvent
  Triethylene glycol
  Triethylene glycol monobutyl ether (hereinafter, referred to as "TEGmBE")
  Propylene glycol
  Dipropylene glycol
  Glycerin
  Triethanolamine Examples 1B to 5B, Comparative Examples 1B to 5B, Reference Examples 1B to 2B Each ink was prepared according to the composition illustrated in Table 4 and Table 5 described below by mixing in each component and stirring. In addition, miscellaneous materials were removed from each ink composition by filtering with a membrane filter having a pore diameter of 1 μm. In addition, in Table 4 and Table 5 shown below, the unit of the numeric value is mass %, and the sum is 100.00 mass %.

In addition, the "dissolved nitrogen" in Table 6 shown below represents an amount of nitrogen which was dissolved in the ink, and the unit thereof is ppm.

TABLE 4

Table 4

| | Example 1B | Example 2B | Example 3B | Example 4B | Example 5B | Comparative example 1B | Comparative example 2B | Comparative example 3B |
|---|---|---|---|---|---|---|---|---|
| Presence or absence of filter | Present | Present | Present | Present | Present | Absent | Present | Present |
| C.I. Direct Blue 199 | 4 | 4 | 4 | 4 | 4 | 4 | 4 | 4 |
| Triethylene glycol | 10 | 10 | 10 | 10 | 10 | 10 | 10 | 10 |
| TEGmBE | 8 | 8 | 8 | 8 | 8 | 8 | 8 | 8 |
| Propylene glycol | 1 | 1 | 1 | 1 | 1 | 1 | 1 | 1 |
| Dipropylene glycol | 1 | 1 | 1 | 1 | 1 | 1 | 1 | 1 |
| Glycerin | 10 | 10 | 10 | 10 | 10 | 10 | 10 | 10 |
| Triethanolamine | 0.5 | 0.5 | 0.5 | 0.5 | 0.5 | 0.5 | 0.5 | 0.5 |
| Surfactant 1 | 0.1 | 0.1 | 0.1 | 0.1 | 0.1 | 0.1 | 0.1 | — |
| Surfactant 2 | — | — | — | 0.1 | — | — | — | — |
| Surfactant 3 | — | — | — | — | 0.1 | — | — | — |
| Surfactant 4 | — | — | — | — | — | — | — | — |
| Surfactant 5 | — | — | — | — | — | — | — | — |
| Surfactant 6 | — | — | — | — | — | — | — | — |
| POAAE1 | 0.05 | — | — | 0.05 | 0.05 | 0.05 | — | 0.05 |
| POAAE2 | — | 0.05 | — | — | — | — | — | — |
| POAAE3 | — | — | 0.05 | — | — | — | — | — |
| Ion exchanged water | Residual quantity | Residual quantity | Residual quantity | Residual quantity | Residual quantity | Residual quantity | Residual quantity | Residual quantity |
| Sum | 100.00 | 100.00 | 100.00 | 100.00 | 100.00 | 100.00 | 100.00 | 100.00 |

TABLE 5

| | Comparative example 4B | Comparative example 5B | Reference example 1B | Reference example 2B |
|---|---|---|---|---|
| Presence or absence of filter | Present | Present | Present | Present |
| C. I. Direct Blue 199 | 4 | 4 | 4 | 4 |
| Triethylene glycol | 10 | 10 | 10 | 10 |
| TEGmBE | 8 | 8 | 8 | 8 |
| Propylene glycol | 1 | 1 | 1 | 1 |
| Dipropylene glycol | 1 | 1 | 1 | 1 |
| Glycerin | 10 | 10 | 10 | 10 |
| Triethanolamine | 0.5 | 0.5 | 0.5 | 0.5 |
| Surfactant 1 | — | — | — | — |
| Surfactant 2 | 0.1 | — | — | — |
| Surfactant 3 | — | 0.1 | 0.1 | 0.1 |
| Surfactant 4 | — | 0.1 | 0.1 | 0.1 |
| Surfactant 5 | 0.1 | — | — | — |
| POAAE1 | 0.05 | 0.05 | 0.05 | 0.05 |
| POAAE2 | — | — | — | — |
| POAAE3 | — | — | — | — |
| Ion exchanged water | Residual quantity | Residual quantity | Residual quantity | Residual quantity |
| Sum | 100.00 | 100.00 | 100.00 | 100.00 |

Measurement and Evaluation Methods

1B. Measurement of Dissolved Nitrogen of Ink

Dissolved nitrogen was measured by using a 6890N Network GC manufactured by Agilent Technologies. The measurement results are illustrated in Table 3 shown below.

Here, the deaeration processing was performed only with respect to each ink of the reference examples 1B to 2B, and was not performed with respect to each ink of the examples and the comparative examples. The deaeration processing in the reference examples 1B to 2B used a chamber type vacuum deaeration apparatus which is available on the market, and adjusts the deaeration time. Accordingly, each of inks that had different dissolved nitrogen from each of others was prepared.

2B. Evaluation of Dissolution Stability

A visual observation on the each prepared ink was performed to check whether the material components were dissolved (dispersed) uniformly or not.

Evaluation standards were as follows. The evaluation results are illustrated in Table 6 shown below.

B: Raw material components of the ink were dissolved (dispersed) uniformly, and undissolved floating materials were not observed.

D: Raw material components of the ink were not dissolved (dispersed), and undissolved floating materials were observed.

3B. Evaluation of Preservation Stability

Each prepared ink was divided by a 20 ml glass bottle with a lid, and was left for one week at 70° C. The liquid surface of the ink was observed, and presence or absence of floating materials was visually checked. Furthermore, when the ink was filtered with a filter having a pore diameter of 10 μm, the presence or absence of collected materials (filtered materials) was checked.

Evaluation standards were as follows. The evaluation results are illustrated in Table 6 shown below.

B: Neither floating materials nor collected materials were confirmed.

D: Floating materials or collected materials was confirmed.

4B. Evaluation of Initial Filling Characteristics

The ink tank of an ink jet printer (L100 [name of product], manufactured by Seiko Epson Corporation) was filled with each prepared ink. An initial filling operation was performed to the head according to an initial filling sequence determined by L100. After that, in order to check whether or not the ink can be discharged from all of the nozzles of the head, a nozzle check was performed (the nozzle diameter of the used nozzle was approximately 22 μm). When there were nozzles which could not discharge ink, a cleaning (absorption of the ink in the nozzles) of the head was performed, and after that, the nozzle check was performed again. Based on the number of times of the cleaning required until the ink could be discharged from all of the nozzles, the initial filling characteristics were evaluated according to the following evaluation standards. The evaluation results are illustrated in Table 6 shown below.

B: The ink was discharged from all of the nozzles simply by the initial filling sequence.

C: The number of times of cleaning required until the ink could be discharged from all of the nozzles was 1.

D: The number of times of cleaning required until the ink could be discharged from all of the nozzles was 2.

5B. Evaluation of Continuous Printing Stability

According to the above-described "4B. Evaluation of initial filling characteristics", after confirming that the ink could be discharged from all of the nozzles of the head, when an image of 70% Duty was printed by using each ink and a plain paper sheet (P paper sheet [name of product], manufactured by Fuji Xerox Co., Ltd.) of A4 size, the evaluation of continuous printing stability was performed (the nozzle diameter of the nozzles used was approximately 22 μm). The total number of printed paper sheets was 1,000 since the continuous printing with 500 paper sheets was performed twice. After that, the nozzle check was performed, and the continuous printing stability was evaluated by the following evaluation standards, based on the number of times of nozzle omission. The evaluation results are illustrated in Table 6 shown below.

A: The number of times of generation of nozzle omission was 0.

B: The number of times of generation of nozzle omission was 1.

C: The number of times of generation of nozzle omission was 2.

D: The number of times of generation of nozzle omission was 3 or more.

TABLE 6

Table 6

| | Example No. | | | | | | | | | | | |
|---|---|---|---|---|---|---|---|---|---|---|---|---|
| | Example | | | | | Comparative example | | | | | Reference example | |
| Item | 1B | 2B | 3B | 4B | 5B | 1B | 2B | 3B | 4B | 5B | 1B | 2B |
| Dissolved nitrogen | 8.4 | 8.1 | 8.0 | 8.7 | 8.7 | 8.4 | 8.1 | 8.2 | 8.3 | 7.9 | 5.5 | 1.4 |
| Dissolution stability | B | B | B | B | B | B | D | B | B | B | B | B |
| Preservation stability | B | B | B | B | B | B | D | B | B | B | B | B |
| Initial filling characteristics | B | B | C | B | B | D | D | D | D | D | C | B |
| Continuous printing stability | B | B | C | A | A | D | D | D | D | D | C | B |

According to the results in Table 6 described above, it was found that the ink supply system and the ink jet recording apparatus provided with the same (each example) which includes: the ink storage container in which the atmosphere and the ink can be in contact with each other; the head for discharging the ink; the ink supply path which connects the ink storage container and the head and in which the ink flows to the head from the ink storage container; and the filter (D) provided in the ink supply path, and in which the ink contains the alkylene oxide adduct (A) of acetylenic glycol in which the main chain has 12 or more carbon atoms, and polyoxyalkylene alkyl ether (C), has excellent initial filling characteristics and continuous printing stability, and even has excellent dissolution stability and a preservation stability, compared to the ink supply system and the ink jet recording apparatus (each comparative example) which does not include the components and the ink above. In addition, when acetylenic glycol (B) in which the main chain has 10 or more carbon atoms is included in the ink, it was not found that the ink supply system and the ink jet recording apparatus provided with the same had particularly excellent continuous printing stability (Examples 4B and 5B).

In addition, the reference examples will be studied, but the study described below does not limit the scope of the present invention at all. The ink in the reference example 1B had the deaeration processing partially performed thereon and included 5.5 ppm of dissolved nitrogen. In addition, the ink in the reference example 2B had the deaeration processing sufficiently performed thereon and included 1.4 ppm of dissolved nitrogen. Here, the ink which almost does not perform the deaeration processing, that is, the ink which is almost not deaerated has 5 ppm or greater of dissolved nitrogen, for example, and the ink which does not perform the deaeration processing at all, that is, the ink which is not deaerated at all has 7 ppm or greater of dissolved nitrogen, for example (in each example and each comparative example, the deaeration processing is not performed at all). Any of the reference examples has far less than 7 ppm of dissolved nitrogen. In this manner, in a case of the ink in which dissolved air (bubbles) is (relatively) low, even when the alkylene oxide adduct (A) of acetylenic glycol in which the main chain has 12 or more carbon atoms is not included, the initial filling characteristics and the continuous printing stability are excellent. In other words, as the ink storage container in which the atmosphere and the ink are in contact with each other is not used, or as the deaeration processing is performed, it was found that the problem (any one of the initial filling characteristics and the continuous printing stability) to be solved by the present invention does not exist in the ink which includes almost no air (bubbles).

The invention claimed is:

1. An ink composition for ink jet recording, comprising:
    an alkylene oxide adduct of acetylenic glycol in which a main chain has 12 or more carbon atoms;
    acetylenic glycol in which a main chain has 10 or more carbon atoms; and
    polyoxyalkylene alkyl ether.

2. The ink composition for ink jet recording according to claim 1,
    wherein an HLB value of the polyoxyalkylene alkyl ether is 12 to 16.

3. The ink composition for ink jet recording according to claim 1,
    wherein the alkylene oxide adduct is an ethylene oxide adduct.

4. The ink composition for ink jet recording according to claim 1,
    wherein a mass ratio between a content of polyoxyalkylene alkyl ether and a total content of alkylene oxide adduct of acetylenic glycol in which the main chain has 12 or more carbon atoms and acetylenic glycol in which the main chain has 10 or more carbon atoms is 0.10:1.0 to 0.50:1.0.

5. The ink composition for ink jet recording according to claim 1,
    wherein an HLB value of the alkylene oxide adduct of acetylenic glycol in which the main chain has 12 or more carbon atoms is 8 to 15.

6. The ink composition for ink jet recording according to claim 1,
    wherein an HLB value of the acetylenic glycol in which the main chain has 10 or more carbon atoms is equal to or less than 4.

7. The ink composition for ink jet recording according to claim 1, further comprising a coloring agent.

8. The ink composition for ink jet recording according to claim 1, further comprising an organic solvent.

9. An ink supply system, comprising:
- an ink storage container in which atmosphere and ink can be brought into contact with each other and which stores the ink, the ink including:
  - an alkylene oxide adduct of acetylenic glycol in which a main chain has 12 or more carbon atoms:
  - acetylenic glycol in which a main chain has 10 or more carbon atoms; and
  - polyoxyalkylene alkyl ether;
- a print head which discharges the ink;
- an ink supply path which connects the ink storage container and the print head to each other, and in which the ink flows to the print head from the ink storage container; and
- a filter which is provided in the ink supply path.

10. The ink supply system according to claim 9, wherein an average pore diameter of the filter is equal to or less than a nozzle diameter of a nozzle of the print head.

11. The ink supply system according to claim 9, wherein a plurality of filters are provided in the ink supply path.

12. The ink supply system according to claim 9, wherein a material of the filter is a resin.

13. An ink jet recording apparatus, comprising the ink supply system according to claim 9, wherein the ink supplied to the print head from the ink storage container is discharged toward a recording medium from the print head and recording is performed.

* * * * *